United States Patent [19]
Tsuji et al.

[11] Patent Number: 5,301,559
[45] Date of Patent: Apr. 12, 1994

[54] TORQUE DETECTING SYSTEM

[75] Inventors: Yorikazu Tsuji; Toshimi Okazaki; Hiroyuki Nakamura, all of Hiroshima, Japan

[73] Assignee: Mazda Motor Corporation, Hiroshima, Japan

[21] Appl. No.: 949,562

[22] Filed: Sep. 23, 1992

[30] Foreign Application Priority Data

Sep. 26, 1991 [JP] Japan .................................. 3-248052
Mar. 31, 1992 [JP] Japan .................................... 4-75002
May 21, 1992 [JP] Japan ................................... 4-128441
Aug. 21, 1992 [JP] Japan ................................... 4-223067

[51] Int. Cl.$^5$ ............................................. G01L 3/02
[52] U.S. Cl. ........................... 73/862.326; 73/862.325; 324/209
[58] Field of Search ...................... 73/862.321, 862.325, 73/862.326, 862.332, 862.335, 862.328; 324/209, 207.25; 360/73.03; 74/337; 474/12, 17, 70; 475/125, 153

[56] References Cited

U.S. PATENT DOCUMENTS

| 4,572,005 | 2/1986 | Kita ............................. 73/862.335 X |
| 4,979,398 | 12/1990 | Goodzey et al. ............... 73/862.326 |
| 5,001,937 | 3/1991 | Bechtel et al. .............. 73/862.326 X |

FOREIGN PATENT DOCUMENTS

| 1134343 | 4/1957 | France ........................... 73/862.326 |
| 62-239031 | 10/1987 | Japan . |
| 3-115940 | 5/1991 | Japan . |
| 0699450 | 11/1979 | U.S.S.R. ........................ 73/862.326 |
| 1352275 | 5/1974 | United Kingdom . |

Primary Examiner—Richard E. Chilcot, Jr.
Assistant Examiner—Elizabeth L. Dougherty
Attorney, Agent, or Firm—Sixbey, Friedman, Leedom & Ferguson

[57] ABSTRACT

A torque detecting system for detecting the torque acting on a rotational member has first and second magnetic heads provided spaced from each other in the axial direction of the rotational member, and a third magnetic head provided spaced from the first magnetic head by a predetermined angle $\theta o$ in a circumferential direction of the rotational member. First and second magnetic layers are provided on the peripheral of the rotational member and position signals are recorded on the respective magnetic layers through the first and second magnetic heads while the rotational member is rotating under no load. The position signals recorded on the magnetic layers are reproduced through the first to third magnetic heads while the rotational member is rotating under load. The phase difference $\Delta t$ between the position signals reproduced by the first and second magnetic heads is detected and at the same time the time difference t between the position signals reproduced by the first and third magnetic heads is detected. The angle of torsion $\theta$ of the rotational member and the torque T thereon are calculated by use of the time difference t and the phase difference $\Delta t$.

22 Claims, 24 Drawing Sheets

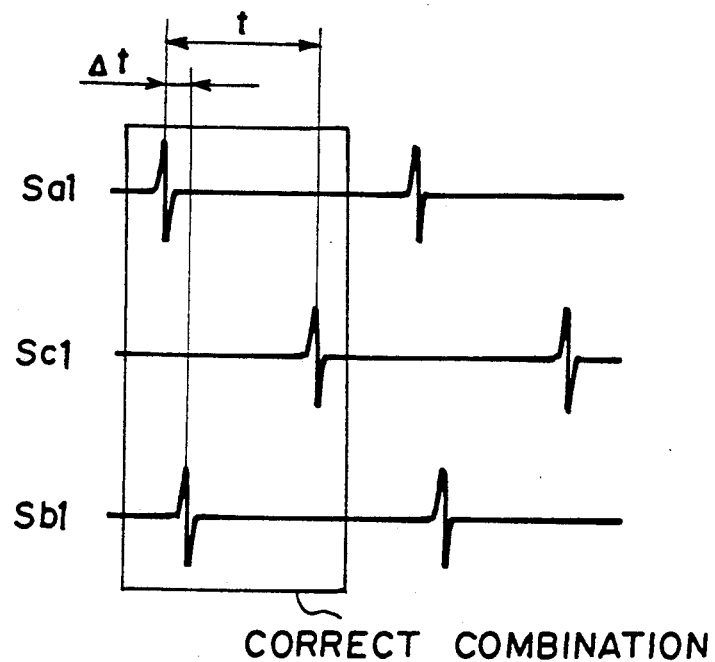
F I G. 16
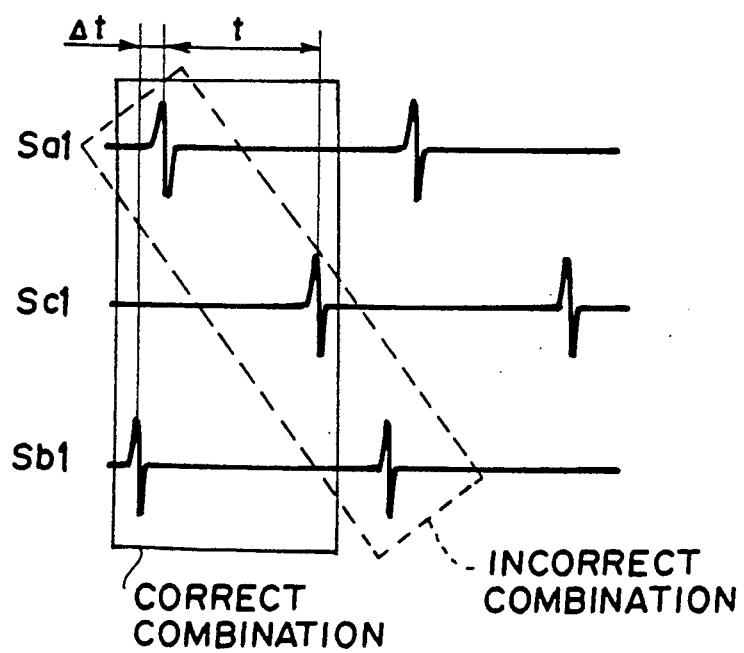
F I G. 17

SIGN DETERMINATION

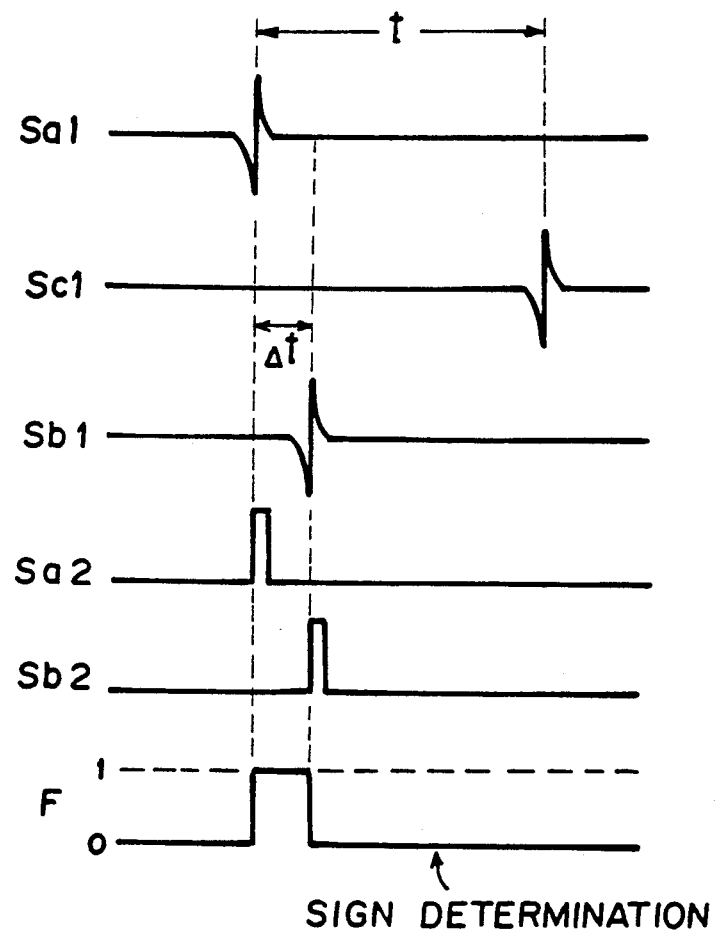

TORQUE DETECTING SYSTEM

BACKGROUND OF THE INVENTION

1. Field of the Invention

This invention relates to a torque detecting system for detecting torque acting on a rotational member such as a power transmission shaft of a motor vehicle, and more particularly to such a torque detecting system which detects the torque on the basis of the angle of torsion of the rotational member.

2. Description of the Prior Art

Recently there is an increasing demand for torque detection. For example, in order to precisely control torque distribution to the front wheels and the rear wheels in a four-wheel drive vehicle, the torque acting on each rotational member must be detected with a high accuracy.

There has been wide known a torque detecting system which detects the angle of torsion of the rotational member due to torque acting thereon and determines the magnitude of the torque on the basis of the angle of torsion. For example, at least a pair of rotary encoders are provided on the rotational member and the angle of torsion is measured on the basis of the difference in phase $\Delta t$ of the detecting signals of the encoders, and the angle of torsion is converted to torque.

As such a rotary encoder, there have been known those using optical means and magnetic means. For example, there is disclosed, in Japanese Unexamined Patent Publication No. 62(1987)-239031, a torque detecting system using magnetic rotary encoders. However, in order to detect the angle of torsion by use of such rotary encoders, the rotational member must be provided with a slit, a gear or the like, which adds to size and weight of the system. Further mounting error is inherently produced when mounting the rotary encoders. Further when residual torsional strain of the rotational member accumulates, the relative positions of the rotary encoders gradually change and the torque detecting accuracy deteriorates with time.

The torque acting on a rotational member can also be detected by use a strain gauge or a magnetostrictive material. However use of the strain gauge encounters difficulties in bonding the strain gauge to the rotational member and taking out a signal from the strain gauge, and use of the magnetostrictive material is disadvantageous in that the magnetostrictive material must be bonded to the rotational member or the rotational member must be machined to form a groove or the like.

Thus there has been proposed in Japanese Unexamined Patent Publication No. 3(1991)-115940 a torque detecting system which detects the torque on a rotational member in the following manner.

In the torque detecting system, a pair of magnetic recording media such as magnetic disks are attached to the rotational member spaced from each other by a predetermined distance L in the longitudinal direction of the rotational member, a pair of magnetic heads are provided respectively opposed to the magnetic recording media, periodic signals which are the same in phase are recorded on the media by the heads while no load is acting on the rotational member, the periodic signals are reproduced by the heads when load is acting on the rotational member, a phase difference $\Delta t$ between the reproduced signals is detected and the torque T on the rotational member is calculated according to the following formula on the basis of the phase difference $\Delta t$.

$$T = \pi^3 G d^4 . \Delta t . (f/fo) . No/16L \quad (1)$$

wherein G represents the transverse modulus of the rotational member, d represents the diameter of the rotational member, f represents the frequency of the reproduced signal, fo represents the frequency of the recorded signal and No represents the rotational speed of the rotational member upon recording of the signal.

The torque detecting system can accurately detect the torque without change with time since the periodic signals can be rewritten any time. However the system gives rise to another problem that when the rotational speed of the rotational member fluctuates, the periodic signals cannot be recorded with accuracy and an error is produced in the calculated value of the torque. Generally the speed of a rotational member in the driving system of a vehicle frequently fluctuates and it is very difficult to suppress the fluctuation.

SUMMARY OF THE INVENTION

In view of the foregoing observations and description, the primary object of the present invention is to provide a torque detecting system which is simple in structure and small in size and can detect the torque on a rotational member with a high accuracy free from an error due to change with age or due to mounting error.

Another object of the present invention is to provide a torque detecting system which can detect the torque on a rotational member with a high accuracy even if the rotational speed of the rotational member fluctuates.

Still another object of the present invention is to provide a torque detecting system which can detect the torque on a rotational member with a high accuracy irrespective of the direction of load acting on the rotational member.

Still another object of the present invention is to provide a torque detecting system which can easily detect the direction of load acting on a rotational member.

In accordance with the present invention, first and second magnetic heads are provided spaced from each other in the axial direction of the rotational member, and a third magnetic head is provided spaced from the first magnetic head by a predetermined angle $\theta o$ in a circumferential direction of the rotational member. The phase difference $\Delta t$ between the position signals reproduced by the first and second magnetic heads is detected and at the same time the time difference t between the position signals reproduced by the first and third magnetic heads is detected. The angle of torsion $\theta$ of the rotational member and the torque T thereon are calculated by use of the time difference t and the phase difference $\Delta t$.

That is, in accordance with the present invention, there is provided a torque detecting system for detecting torque acting on a rotational member comprising a first magnetic head which is positioned close to the peripheral surface of the rotational member and is opposed to a first magnetic recording portion provided on the peripheral surface of the rotational member, a second magnetic head which is positioned close to the peripheral surface of the rotational member and is opposed to a second magnetic recording portion provided on the peripheral surface of the rotational member, the second magnetic head being spaced from the first magnetic head by a predetermined distance in the longitudinal direction of the rotational member, a third magnetic head which is positioned close to the peripheral surface of the rotational member and is opposed to the first magnetic recording portion, the third magnetic head being angularly spaced from the first magnetic head by a predetermined angle in the circumferential direction of the rotational member, a recording means which records first and second position signals respectively on the first and second magnetic recording portions through the first and second magnetic heads while the rotational member is rotating under no load, a reproducing means which reproduces the first position signal through the first and third magnetic heads and the second position signal through the second magnetic head while the rotational member is rotating under load, a phase difference detecting means which detects the phase difference between the position signals reproduced through the first and second magnetic heads, a time difference detecting means which detects the time difference between the position signals reproduced through the first and third magnetic heads, a torsional angle calculating means which calculates the angle of torsion of the rotational member when it is rotating under load on the basis of the predetermined angle, the phase difference and the time difference, and a torque calculating means which calculates the torque acting on the rotational member on the basis of the angle of torsion.

The magnetic recording portions may be formed, for instance, by application or plasma spray coating of magnetic material on the peripheral surface of the rotational member. Further the magnetic recording portions may be parts of the rotational member itself when the rotational member is formed of magnetic material. Further the first and second magnetic recording portions need not be separate from each other but may be formed integrally with each other.

The first and third magnetic heads may comprise a single multi-gap magnetic head having a pair of gaps.

The angle of torsion $\theta$ of the rotational member can be calculated on the basis of the angle $\theta o$ between the first and third magnetic heads, the phase difference $\Delta t$ and the time difference t according to, for instance, the following formula (2) and the torque T acting on the rotational member can be calculated on the basis of the angle of torsion $\theta$ according to, for instance, the following formula (3).

$$\theta = (\Delta t/t) \cdot \theta o \qquad (2)$$

$$T = \pi G d^4 \theta / 64L \qquad (3)$$

wherein G represents the transverse modulus of the rotational member, d represents the diameter of the rotational member and L represents the distance between the first and second magnetic heads.

Preferably, the position signals recorded on the first magnetic layer are recorded at regular intervals and as large as possible in number as described above. The intervals at which the position signals are recorded should be larger than the angle $\theta o$ between the first and third magnetic heads in order to correctly detect the time difference t.

For this purpose, the torque detecting system in accordance with one embodiment of the present invention has a rotational speed detecting means for detecting the rotational speed of the rotational member. Further, the recording circuit means is arranged to change the properties of the position signals recorded on the first magnetic layer according to the rotational speed of the rotational member so that the torque can be detected with a high accuracy without being affected by fluctuation of the rotational speed of the rotational member.

For example, the rotational speed detecting means comprises a signal recording and reproducing means which records a position signal on a magnetic recording portion provided on the rotational member through a magnetic head and reproduces the position signal through a magnetic head, and a rotational speed calculating means which calculates the rotational speed on the basis of the reproduced position signal.

The signal recording and reproducing means may comprise a pair of magnetic heads which are angularly spaced from each other by a predetermined angle in a circumferential direction of the rotational member, and said rotational speed calculating means calculates the rotational speed on the basis of the predetermined angle and the time difference between reproduced position signals which are obtained by reproducing the position signal, which has been recorded through one of the magnetic heads, through both the magnetic heads.

The first magnetic head may double said one of the magnetic heads and said third magnetic head may double the other of the magnetic heads.

In another embodiment of the present invention, the torque detecting system further comprises a load direction determining means which determines the direction of load acting on the rotational member.

For example, the direction of load acting on the rotational member can be determined based on comparison of the difference between the times at which the reproduced position signals respectively reproduced through the first and second magnetic heads are detected and the difference between the times at which the reproduced position signals respectively reproduced through the second and third magnetic heads are detected.

The direction of load acting on the rotational member can also be determined according to the detecting timing of the reproduced position signals respectively reproduced through the first and second magnetic heads

BRIEF DESCRIPTION OF THE DRAWINGS

FIGS. 16 and 17 are timing charts for illustrating the problem to be solved by the third embodiment, FIGS. 30 and 31 are timing charts for illustrating the operation of the sixth embodiment.

DESCRIPTION OF THE PREFERRED EMBODIMENTS

Figure 1:
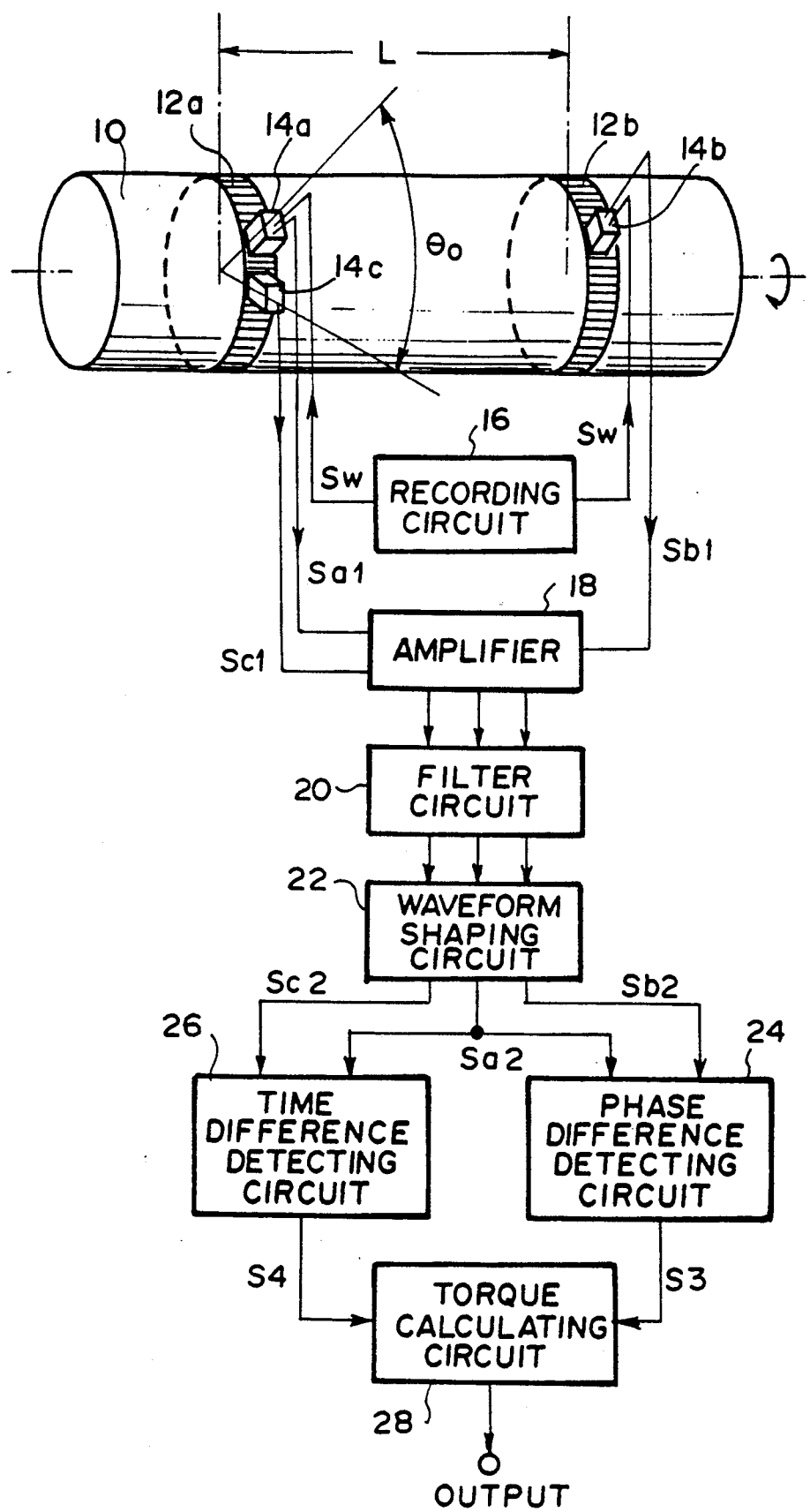
FIG. 1 is a schematic view showing a torque detecting system in accordance with a first embodiment of the present invention.

In FIG. 1, a torque detecting system in accordance with a first embodiment of the present invention detects torque on a rotational member 10 (e.g., an output shaft of an automotive automatic transmission) which is connected to a driving source (not shown) at the left end and to load at the right end. The torque detecting system includes first and second annular magnetic layers 12a and 12b which are formed on the outer peripheral surface of the rotational member 10. First and second magnetic heads 14a and 14b are positioned close to the outer surface of the rotational member 10 respectively opposed to the first and second magnetic layers 12a and 12b. The first and second magnetic heads 14a and 14b are spaced from each other by a predetermined distance L in the axial direction of the rotational member 10. A third magnetic head 14c is positioned close to the outer surface of the rotational member 10 opposed to the first magnetic layer 12a. The third magnetic head 14c is angularly spaced from the first magnetic head 14a by a predetermined angle $\theta_o$ (10° in this particular embodiment) in a circumferential direction of the rotational member 10. A recording circuit 16 records position signals Sw in the same phases on the first and second magnetic layers 12a and 12b through the first and second magnetic heads 14a and 14b. The torque detecting system further comprises a combination of an amplifier 18, a filter circuit 20 and a waveform shaping circuit 22 which reproduces the position signals Sw through the first to third magnetic heads 14a, 14b and 14c, a phase difference detecting circuit 24 which detects the phase difference $\Delta t$ between the position signals reproduced through the first and second magnetic heads 14a and 14b, a time difference detecting circuit 26 which detects the time difference t between the position signals reproduced through the first and third magnetic heads 14a and 14c, and a torque calculating circuit 28 which calculates the angle of torsion $\theta$ of the rotational member 10 on the basis of the angle $\theta_o$, the phase difference $\Delta t$ and the time difference t and calculates the torque T acting on the rotational member 10 on the basis of the angle of torsion $\theta$.

The magnetic layers 12a and 12b may be formed, for instance, by applying magnetic paint, e.g., paint formed by dispersing magnetic powder such as ferrite in resin binder such as epoxy resin, on the outer surface of the rotational member 10, or by plating a magnetic layer such as of cobalt on the outer surface of the rotational member 10.

The clearances between the magnetic heads 14a, 14b and 14c and the outer surface of the rotational member 10 are about 10$\mu$m.

The operation of this embodiment will be described, hereinbelow.

While the rotational member 10 is rotating released from load, the the recording circuit 16 generates a predetermined pulse signal and sends it to the first and second magnetic heads 14a and 14b simultaneously, thereby recording position signals (magnetic patterns) in the same phases on the magnetic layers 12a and 12b. The position signals need not be recorded at regular intervals in the circumferential direction of the rotational member 10, but may be recorded at any intervals so long as each interval is wider than a space which is determined by the angle $\theta_o$ between the first and third magnetic heads 14a and 14c. Though the position signal theoretically may be of a single pulse, preferably it is of a number of pulses recorded at regular intervals in view of the sampling time in subsequent calculation of the torque, the detecting accuracy, the rotational speed of the rotational member 10 and the like.

Figure 2:
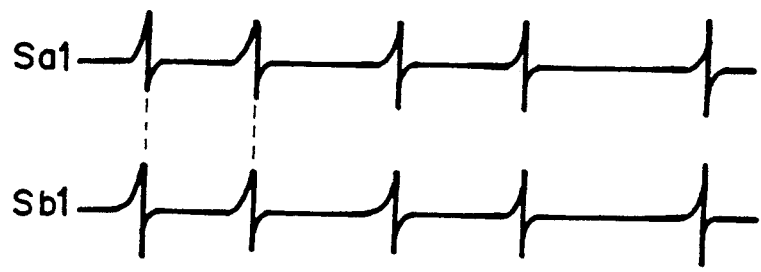
FIGS. 2 and 3 are timing charts for illustrating the operation of the torque detecting system.

In the unloaded stated, the reproduced signals Sa1 and Sb1 obtained by reproducing through the first and second magnetic heads 14a and 14b the position signals recorded on the magnetic layers 12a and 12b are in the same phases as shown in FIG. 2.

Figure 3:
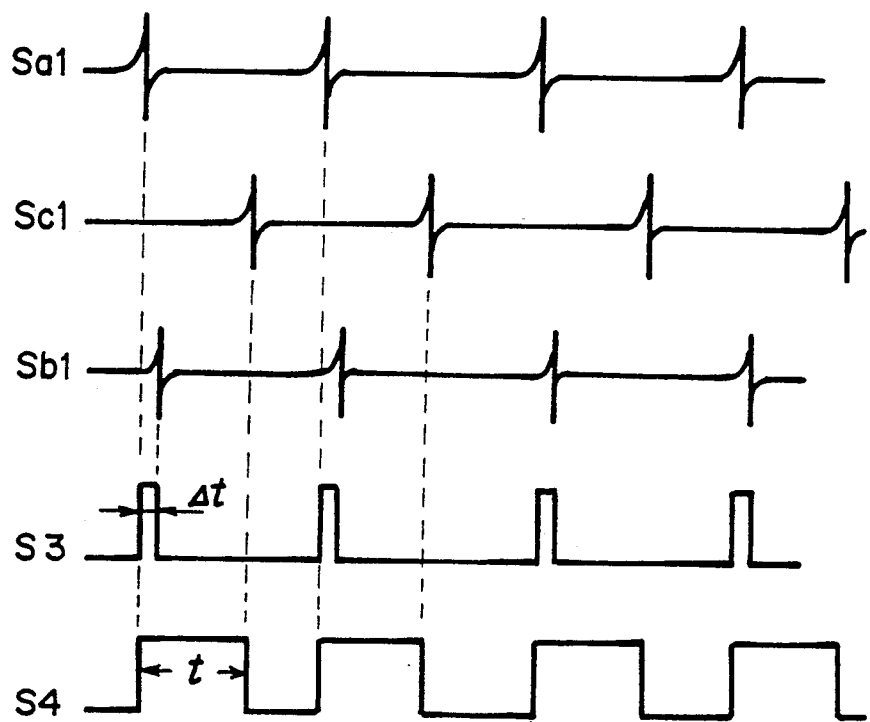

On the other hand, when the position signals on the magnetic layers 12a and 12b are reproduced through the first and second magnetic heads 14a and 14b while the rotational member 10 is rotating under load (torque), the reproduced signals have waveforms which have a phase difference $\Delta t$ relative to each other as shown in FIG. 3. Further the reproduced signal Sc1 obtained by reproducing through the third magnetic head 14c the position signal recorded on the magnetic layers 12a has a waveform which has a time difference t relative to the reproduced signal Sa1 as shown in FIG. 3. The reproduced signals Sa1, Sb1 and Sc1 are input into the amplifier 18 to be amplified therein, and then removed with high frequency noise components in the filter circuit 20. Thereafter they are input into the waveform shaping circuit 22 and converted to square wave signals Sa2, Sb2 and Sc2. The square wave signals Sa2 and Sb2 obtained from the signals Sa1 and Sb1 reproduced through the first and second magnetic heads 14a and 14b are input into the phase difference detecting circuit 24. The square wave signals Sa2 and Sc2 obtained from the signals Sa1 and Sc1 reproduced through the first and third magnetic heads 14a and 14c are input into the time difference detecting circuit 26. The phase difference $\Delta t$ between the square wave signals Sa2 and Sb2 is detected by the phase difference detecting circuit 24 and a detecting signal S3 representing the phase difference $\Delta t$ is sent to the torque calculating circuit 28. The time difference t between the square wave signals Sa2 and Sc2 is detected by the time difference detecting circuit 26 and a detecting signal S4 representing the time difference t is sent to the torque calculating circuit 28.

The torque calculating circuit 28 calculates the angle of torsion $\theta$ of the rotational member 10 on the basis of the angle $\theta o$, the phase difference $\Delta t$ and the time difference t according to the following formula (2) and calculates the torque T acting on the rotational member 10 on the basis of the angle of torsion $\theta$ according to the following formula (3).

$$\theta = (\Delta t/t)\cdot\theta o \quad (2)$$

$$T = \pi^2 G d^4 \theta / 64 L \quad (3)$$

wherein G represents the transverse modulus, d represents the diameter of the rotational member 10 and L represents the distance between the first and second magnetic heads 14a and 14b.

According to the formula (2), the time factor is canceled by term $(\Delta t/t)$ and accordingly, the angle of torsion $\theta$ can be detected without an error even if the position signals are not recorded as accurate periodic signals. That is, the torque can be detected on the basis of the angle $\theta o$ between the first and third magnetic heads 14a and 14c without being affected by the rotational speed of the rotational member 10 or fluctuation thereof upon recording.

As can be understood from the description above, in accordance with the present invention, machining or surface processing of the rotational member 10 or an additional mechanical part such as a slip ring is not required.

Accordingly, the torque detecting system of this embodiment can be small in size and simple in structure and can detect the torque without detecting error due to mounting error or change with age. Further, even if the relative positions of the first and second magnetic heads 14a and 14b gradually change due to residual torsional strain of the rotational member 10, it can be easily compensated for by rewriting the position signals.

Though, in the first embodiment, the first and second magnetic heads 14a and 14b are aligned with each other in the axial direction of the rotational member 10, they may be angularly displaced from each other in the circumferential direction of the rotational member 10.

Though, in this particular embodiment, the position signals recorded on the first and second magnetic layers 12a and 12b are in the same phase, they may be in different phases.

Further though, in the first embodiment, the first and second magnetic layers 12a and 12b are separately formed, they may be formed integrally. Further when the rotational member 10 itself is formed of magnetic material such as structural steel S45C, the magnetic layers 12a and 12b need not be formed and the position signals may be directly recorded on the rotational member 10.

Figure 4:
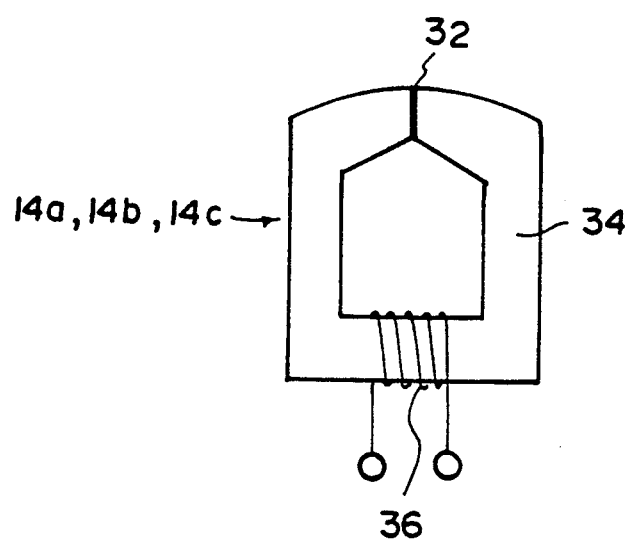
FIG. 4 is a schematic view showing the magnetic head employed in the first embodiment.
Figure 5:
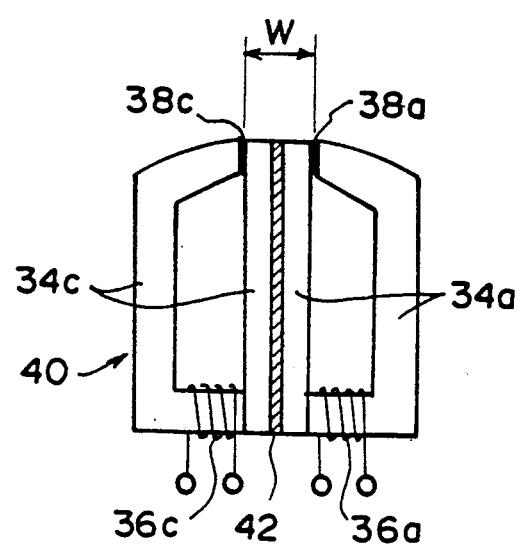
FIG. 5 is a schematic view showing a modification of the magnetic head.
Figure 6:
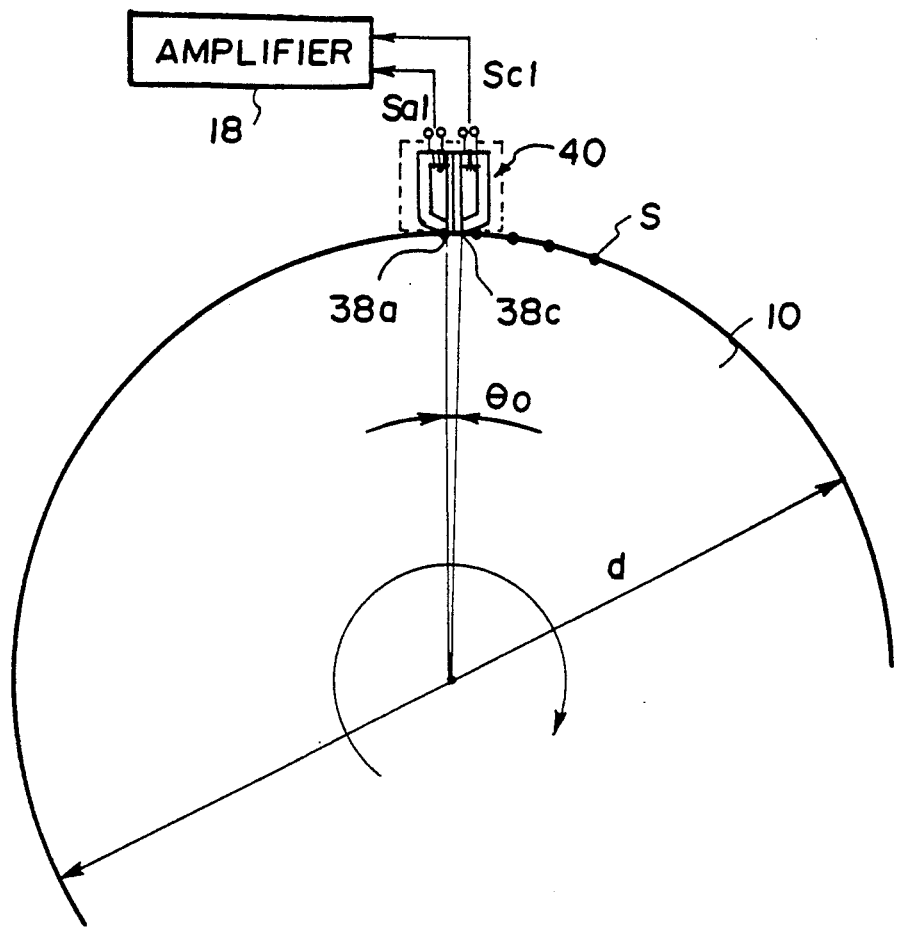
FIG. 6 is a view for illustrating the operation of the magnetic head shown in FIG. 5.

Though each of the magnetic heads 14a to 14c may be of an usual magnetic head comprising a core 34 having a single gap 32 and a winding 36 as shown in FIG. 4, a multi-gap magnetic head 40 having a pair of gaps 38a and 38c as shown in FIG. 5 may be used as the first and third magnetic heads 14a and 14c. The multi-gap magnetic head 40 has a shield plate 42 between the gaps 38a and 38c. The space W between the gaps 38a and 38c is about 200 $\mu$m. The multi-gap magnetic head 40 is used in the manner shown in FIG. 6. Reference character S denotes a position signal recorded through the gap 38a. As can be understood from FIG. 6, the angle $\theta o$ between the gaps 38a and 38c is given by the following formula.

$$\theta o = 2\tan^{-1}(W/d)$$

Figure 7:
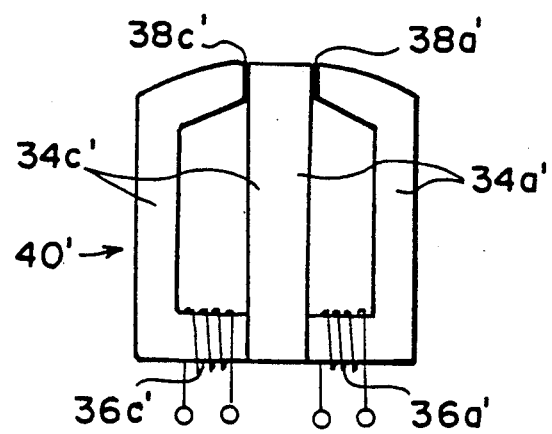
FIG. 7 is a schematic view showing another modification of the magnetic head.

By using such a multi-gap magnetic head, the time difference t can be easily detected and the torque detecting system can be smaller in size. In the multi-gap magnetic head 40, the space W between the gaps 38a and 38c can be sufficiently small relative to the diameter d of the rotational member 10 and can be controlled with a high accuracy of $\mu$m order. Accordingly the torque T acting on the rotational member 10 can be accurately detected with a minimum mounting error. Though the multi-gap magnetic head 40 shown in FIG. 5 is of a so-called three-in-one type having a shield plate between the two gaps, a so-called two-gap type multi-gap magnetic head 40' having no shield plate as shown in FIG. 7 can also be used.

A second embodiment of the present invention will be described with reference to FIGS. 8 to 10, hereinbelow.

Preferably, the position signals recorded on the first magnetic layer 12a are recorded at regular intervals and as large as possible in number as described above. The intervals at which the position signals are recorded should be larger than the angle $\theta o$ between the first and third magnetic heads 14a and 14c in order to correctly detect the time difference t.

Figure 8:
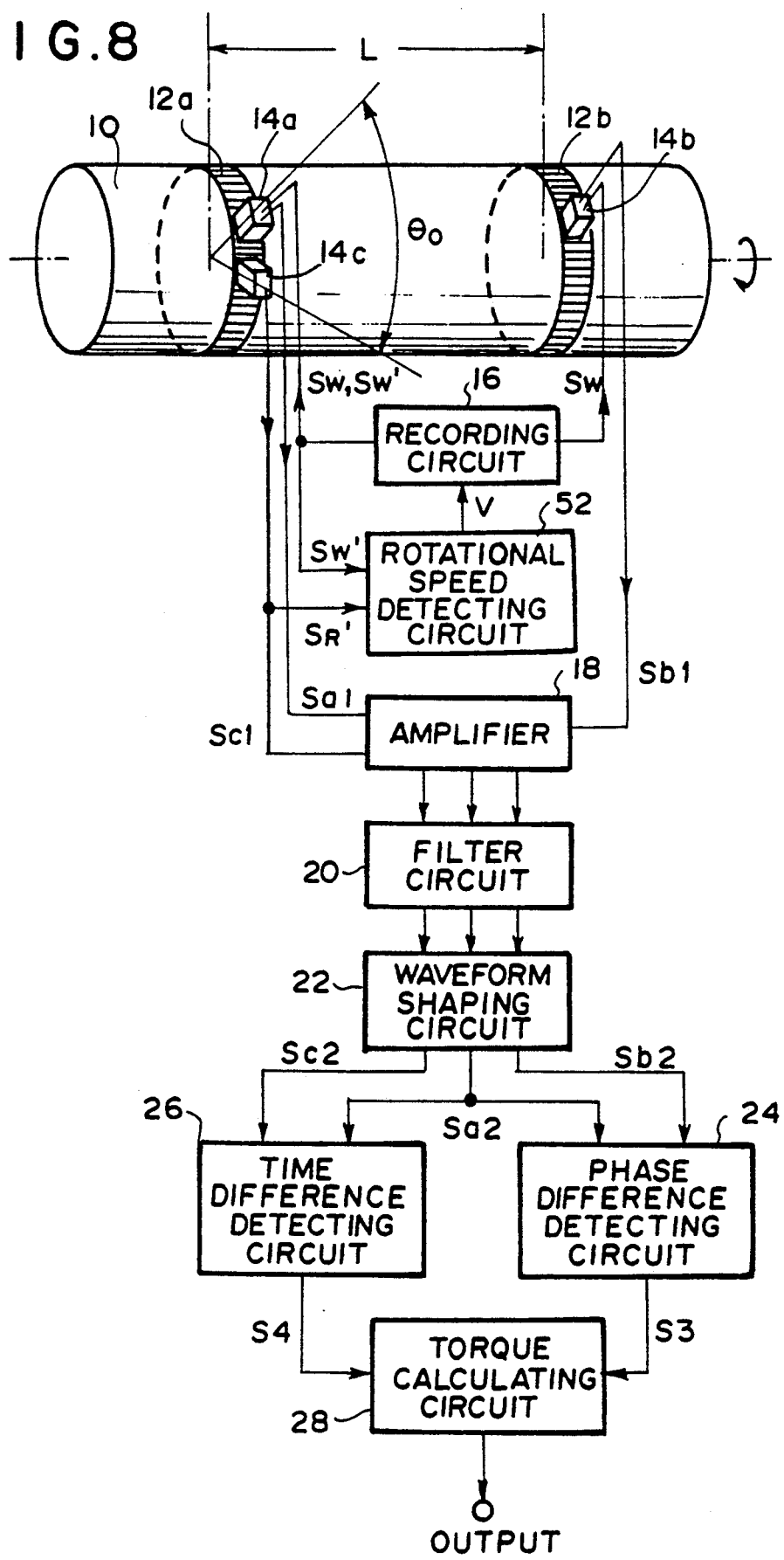
FIG. 8 is a schematic view showing a torque detecting system in accordance with a second embodiment of the present invention.

For this purpose, the torque detecting system of this embodiment has a rotational speed detecting circuit 52 for detecting the rotational speed V of the rotational member 10 as shown in FIG. 8 in addition to the elements of the first embodiment shown in FIG. 1. Further, in this embodiment, the recording circuit 16 is arranged to change the properties of the position signals recorded on the first magnetic layer 12a according to the rotational speed V of the rotational member 10 so that the torque can be detected with a high accuracy without being affected by fluctuation of the rotational speed of the rotational member 10.

Figure 9:
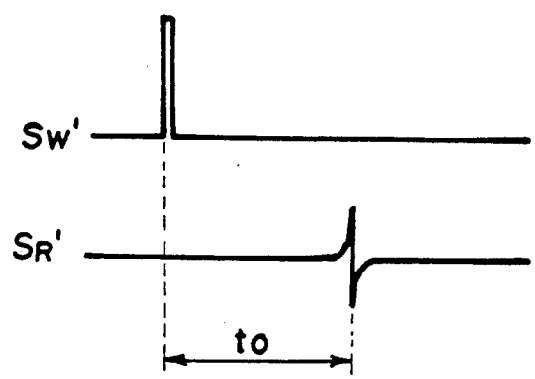
FIGS. 9 and 10 are timing charts for illustrating the operation of the torque detecting system.

That is, the recording circuit 16 outputs a reference signal Sw' in the form of a single pulse signal such as shown in FIG. 9 to the first magnetic head 14a while the rotational member 10 is rotating under no load and records the reference signal Sw' on the first magnetic layer 12a through the first magnetic head 14a.

At the same time the reference signal Sw' is output also to the rotational speed detecting circuit 52. In the rotational speed detecting circuit 52, a time measuring counter begins to count in response to input of the reference signal Sw'. The reference signal Sw' recorded on the first magnetic layer 12a is reproduced by the third magnetic head 14c as the rotational member 10 rotates and the reproduced signal SR' shown in FIG. 9 is input into the rotational speed detecting circuit 52.

The time measuring counter stops in response to input of the reproduced signal SR' and measures the time $T_o$ the rotational member 10 took to rotate by the angle $\theta o$ between the first and third magnetic heads 14a and 14c. Then the rotational speed detecting circuit 52 calculates the rotational speed V of the rotational member 10 according to formula $$V = \theta o \cdot d / 2 t_o \text{ ($\theta o$ being in terms of radian)} \qquad (4)$$

and outputs to the recording circuit 16 a rotational speed signal which represents the rotational speed V of the rotational member 10.

Figure 10:
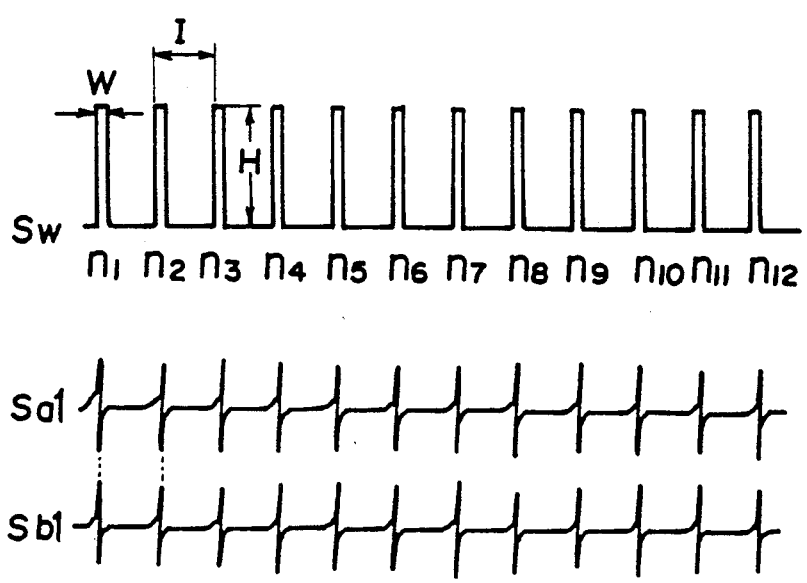

The recording circuit 16 first erases the reference signal Sw' by the first magnetic head 14a and records a plurality of position signals Sw (n1 to n12) on the first and second magnetic layers 12a and 12b in the same phases through the first and second magnetic heads 12a and 12b as shown in FIG. 10. The recording circuit 16 determines the intervals I (period), the pulse width W and the signal intensity H of the position signals Sw according to the rotational speed signal and the number of the pulses n to be recorded per one rotation of the rotational member 10 (n=12 in this particular embodiment).

In this manner, reproduced signals Sa1 and Sb1 which are similar to those shown in FIG. 2 can be obtained while the rotational member 10 is rotating under no load as shown in FIG. 10.

Then the torque T on the rotational member 10 is calculated in the same manner as in the first embodiment.

By determining the intervals I (period) of the position signals Sw and the number of the pulses n to be recorded per one rotation of the rotational member 10 to satisfy the following formulae, the intervals of the position signals Sw as recorded on the rotational member 10 cannot be narrower than the angle $\theta o$ between the first and third magnetic heads 14a and 14b and the time difference t can be correctly detected irrespective of the rotational speed of the rotational member 10.

$$I > \theta o \cdot d / 2V \; (=t_o)$$

$$n < 2\pi / \theta o$$

As can be understood from the description above, in this embodiment, since the intervals I (period) of the position signals Sw are determined according to the rotational speed V of the rotational member 10 not to be smaller than the distance between the first and third magnetic heads 14a and 14b, the torque can be corrected with a high accuracy irrespective of the rotation of the rotational member 10. Further since the pulse width W and the signal intensity H are determined according to the rotational speed V of the rotational member 10, they can be properly set irrespective of the rotation of the rotational member 10 and deformation of the reproduced signals can be avoided.

Though, in this embodiment, the reference signal Sw' is in the form of a single pulse, it may comprise a plurality of pulse signals or a continuous wave signal. In the latter case, the frequency of the reproduced signal is used as the reference.

Figure 11:
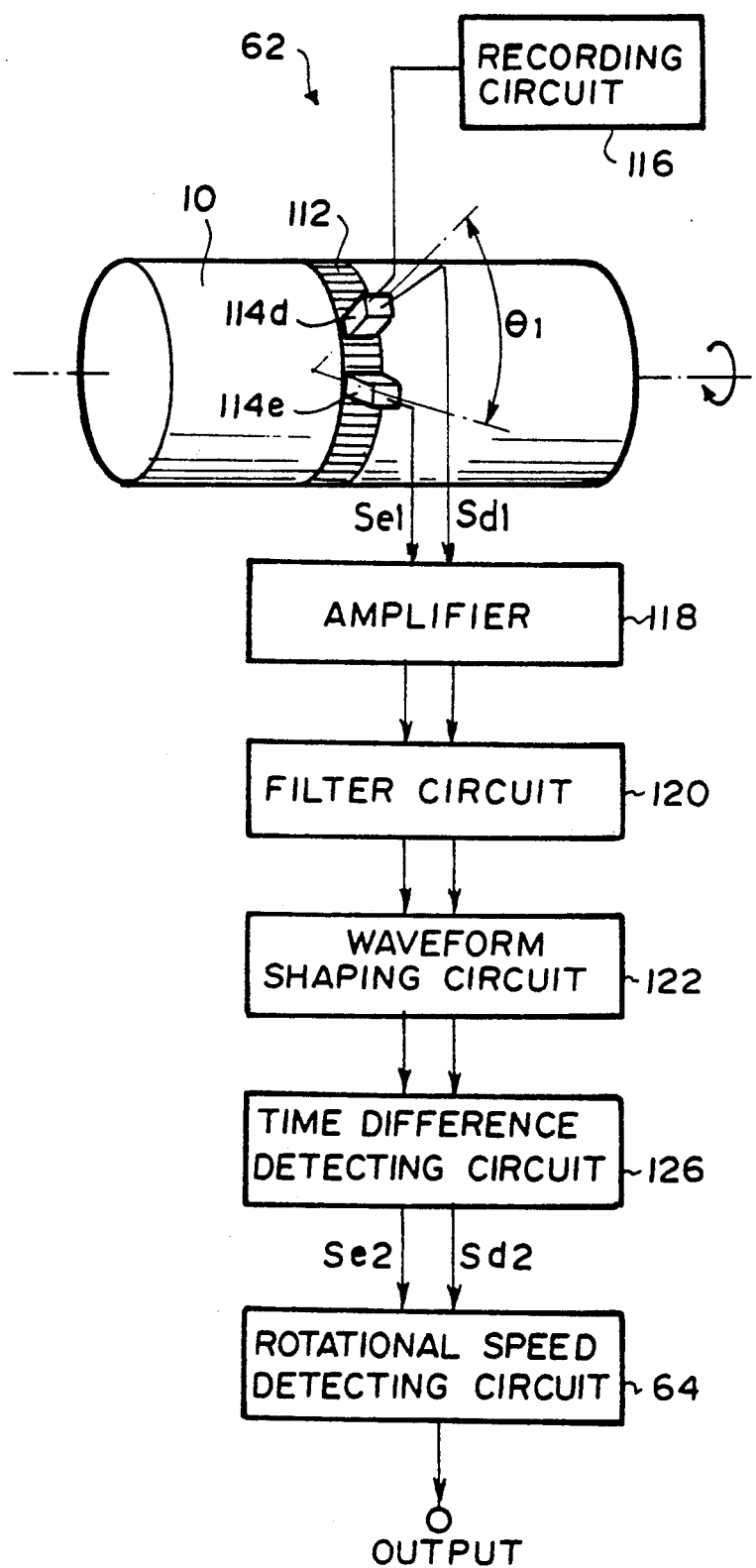
FIG. 11 is a schematic view showing the rotational speed detecting system employed in a modification of the second embodiment.

Though, in the second embodiment, the rotational speed detecting circuit 52 is connected to the first and third magnetic head 14a and 14c of the torque detecting system, the rotational speed detecting means may be provided separately from the torque detecting system as shown in FIG. 11.

In FIG. 11, a rotational speed detecting system 62 comprises an annular magnetic layer 112 which is provided on the peripheral surface of the rotational member 10 in addition to the magnetic layers 12a and 12b of the torque detecting system (though the torque detecting system is not shown in FIG. 11), fourth and fifth magnetic heads 114d and 114e which are opposed to the magnetic layer 112 and are angularly spaced from each other in the circumferential direction of the rotational member 10 by a predetermined angle $\theta 1$, a recording circuit 116 which records a reference signal Sd1 on the magnetic layer 112 through the fourth magnetic head 114d, a combination of an amplifier 118, a filter circuit 120 and a waveform shaping circuit 122 which reproduces the reference signal Sd1 as reproduced signals Sd2 and Se2 through the fourth and fifth magnetic heads 114d and 114e, a time difference detecting circuit 126 which detects the time difference $t_o$ between the reproduced signals, and a rotational speed calculating circuit 64 which calculates the rotational speed V on the basis of the angle $\theta 1$ and the time difference $t_o$.

The recording circuit 116, the amplifier 118, the filter circuit 120, the waveform shaping circuit 122 and the time difference detecting circuit 126 are similar to those in the first embodiment in arrangement and function and will not be described here.

Figure 12:
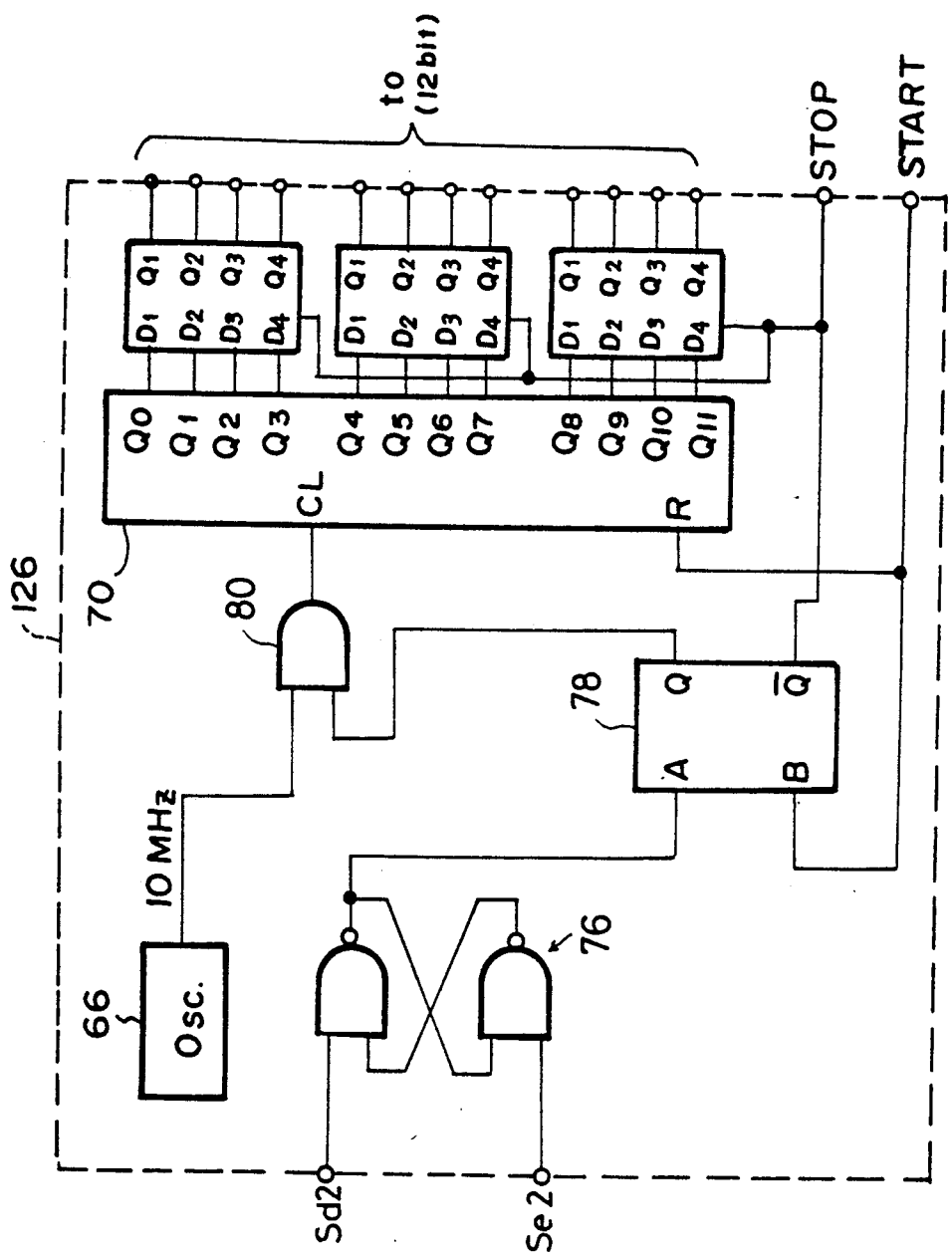
FIG. 12 is a circuit diagram showing an example of the time difference detecting circuit employed in the rotational speed detecting system.
Figure 13:
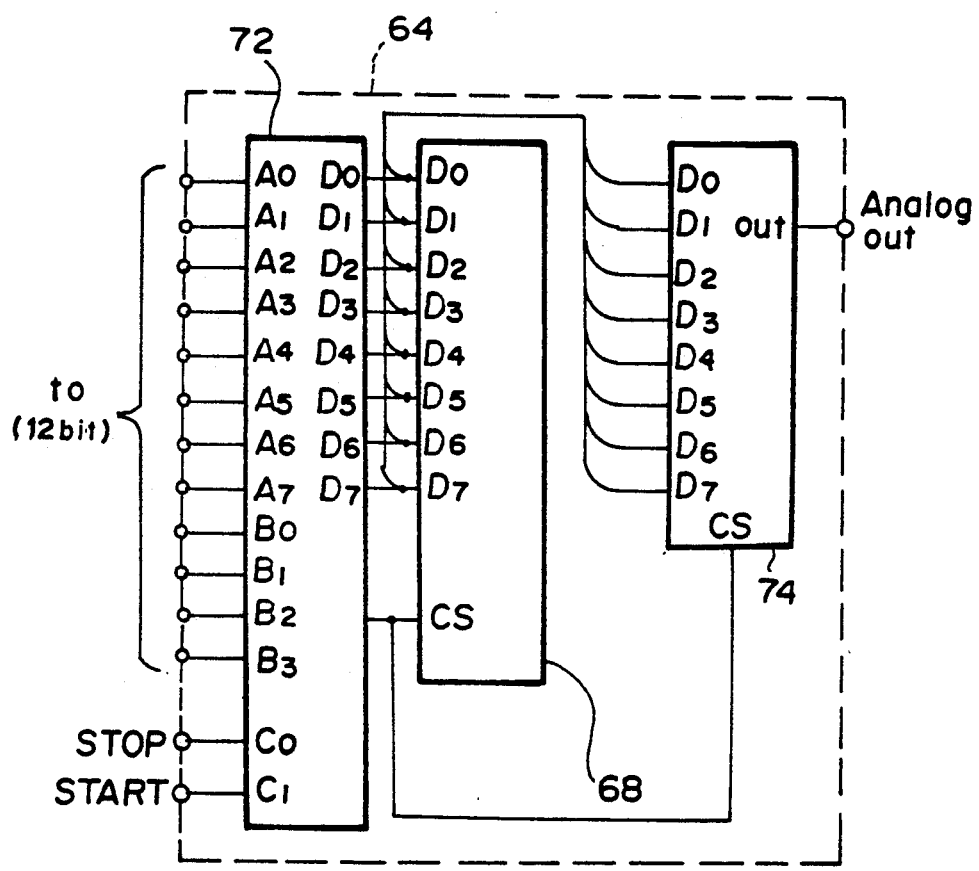
FIG. 13 is a circuit diagram showing an example of the rotational speed calculating circuit employed in the rotational speed detecting system.

The time difference detecting circuit 126 and the rotational speed calculating circuit 64 are shown in FIGS. 12 and 13, respectively.

The reproduced signal Sd2 reproduced through the fourth magnetic head 114d and in the form of a square wave is input into a set terminal of a flip flop 76 of the rotational speed detecting circuit 126 shown in FIG. 12. The reproduced signal Se2 reproduced through the fifth magnetic head 114e and in the form of a square wave is input into a reset terminal of the flip flop 76. The output terminal of the flip flop 76 is connected to a set terminal of another flip flop 78 and Q terminal of the flip flop 78 is connected to one of input terminals of an AND circuit 80. A 10MHz reference clock generated by a clock oscillator 66 is input into the other input terminal of the AND circuit 80. The output terminal of the AND circuit 80 is connected to a clock terminal of a counter 70. The counter 70 counts the time difference $t_o$ between the signals Sd2 and Se2 with the reference clock and outputs the result of the counting to the rotational speed detecting circuit 64 in the form of 12 bit parallel signals.

Figure 14:
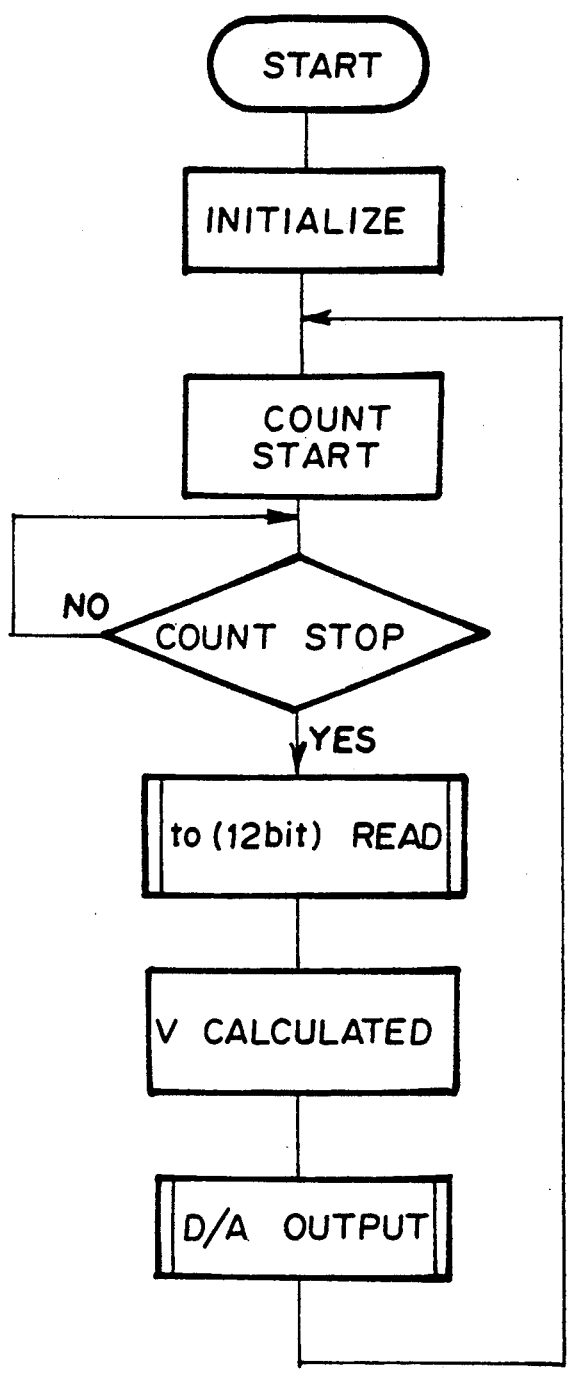
FIG. 14 is a flow chart for illustrating the operation of the time difference detecting circuit and the rotational speed calculating circuit.

The rotational speed detecting system detects the rotational speed V of the rotational member 10 in the manner shown in FIG. 14.

A microcomputer 68 of the rotational speed calculating circuit 64 first performs initialization and outputs a count start signal START to the counter 70 of the time difference detecting circuit 126. The counter 70 is set by the count start signal START and begins to count the time difference $t_o$ between the signals Sd2 and Se2. The microcomputer 68 waits for a count stop signal STOP from the counter 70 and reads the time difference $t_o$ through an interface IC 72 in response receipt of the count stop signal STOP, and then calculates the rotational speed V on the basis of the time difference $t_o$ according to the formula (4) described above in conjunction with the second embodiment.

Thereafter the microcomputer 68 transfers the result of the calculation to a D/A converter 70 which outputs the rotational speed V as an analog signal. Then the microcomputer 68 outputs the count start signal START again to repeat the operation described above.

Now a third embodiment of the present invention will be described wit reference to FIGS. 15 to 19, hereinbelow.

In the first and second embodiments, the position signals Sw recorded on the first and second magnetic layers 12a and 12b through the first and second magnetic heads 14a and 14b are in the same phase. However they not be in the same phases but it is preferred that the position signal Sw recorded through the second magnetic head 12b be delayed in phase by a predetermined time relative to the position signal Sw recorded by the first magnetic head 12a.

That is, when the position signals Sw recorded on the first and second magnetic layers 12a and 12b are in the same phases, the reproduced signals Sb1 from the second magnetic head 14b delay by phase difference $\Delta t$ relative to the reproduced signals Sa1 from the first magnetic head 14a so long as a positive torque is acting on the rotational member 10 as shown in FIG. 16. The delay in phase is sufficiently small relative to the delay (by an mount corresponding to the time difference t) in phase of the reproduced signals Sc1 from the third magnetic head 14c relative to the reproduced signals Sa1 from the first magnetic head 14a. Accordingly, so long as a positive torque is acting on the rotational member 10, a correct combination of the reproduced signals Sa1, Sb1 and Sc1 can be obtained by selecting the signals based on the reproduced signals Sa1 when the rotational member 10 is rotating in the regular direction and on the reproduced signals Sc1 when the rotational member 10 is rotating in the reverse direction. However when a negative torque is acting on the rotational member 10, the reproduced signals Sb1 advances by the time difference t relative to the reproduced signals Sa1 as shown in FIG. 17, and accordingly, if the signals are selected in the manner described above, a correct combination of the reproduced signals Sa1, Sb1 and Sc1 cannot be obtained.

In this embodiment, a delay circuit 54 is provided in addition to the elements of the second embodiment shown in FIG. 8 and the position signals recorded through the second magnetic head 14b are intentionally delayed in phase by a predetermined time $\Delta t_o$ relative to the position signals recorded through the first magnetic head 14a so that the reproduced signals Sb1 delay in phase by the predetermined time $\Delta t_o$ relative to the reproduced signals Sa1 while the rotational member 10 is rotating under no load. With this arrangement, a correct combination of the reproduced signals Sa1, Sb1 and Sc1 can be obtained irrespective of whether the torque acting on the rotational member 10 is positive or negative.

Figure 18:
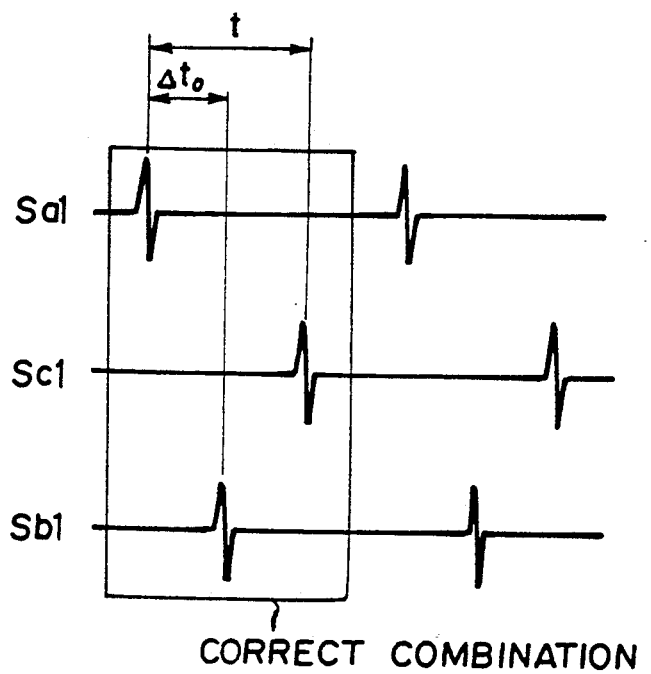
FIGS. 18 and 19 are timing charts for illustrating the operation of the third embodiment.

FIG. 18 shows the detecting timing of the reproduced signals Sa1, Sb1 and Sc1 while the rotational member 10 is rotating under no load in this embodiment. That is, since the position signals on the second magnetic layer 12b delay in phase by $\Delta t_o$ relative to the position signals on the first magnetic layer 12a as they are recorded, the reproduced signals Sb1 are always between the reproduced signals Sa1 and Sc1 irrespective of whether the rotational member 10 is rotating under load or no load.

Accordingly, it can be determined that the combination of the reproduced signals is correct only when a reproduced signal Sb1 is detected after a reproduced signal Sa1 is detected (or a reproduced signal Sc1 depending on the rotating direction of the rotational member 10).

Figure 19:
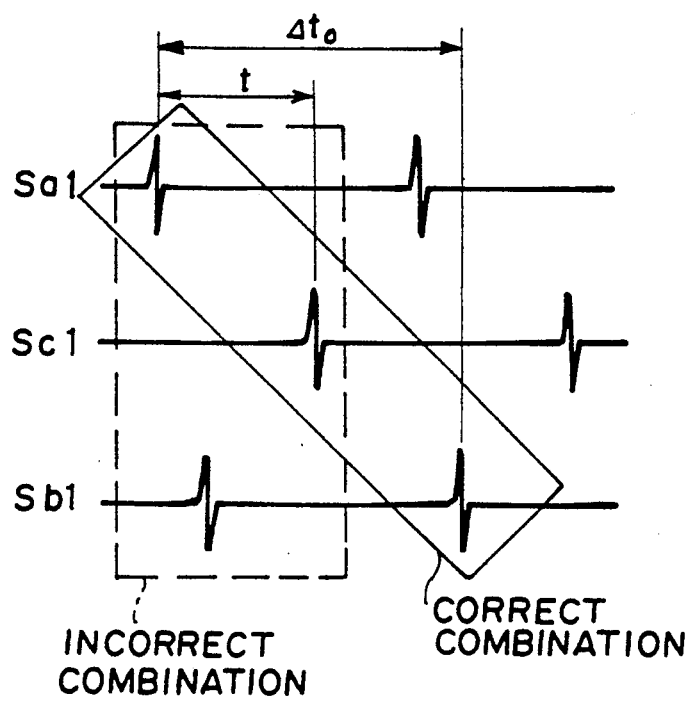
Figure 20:
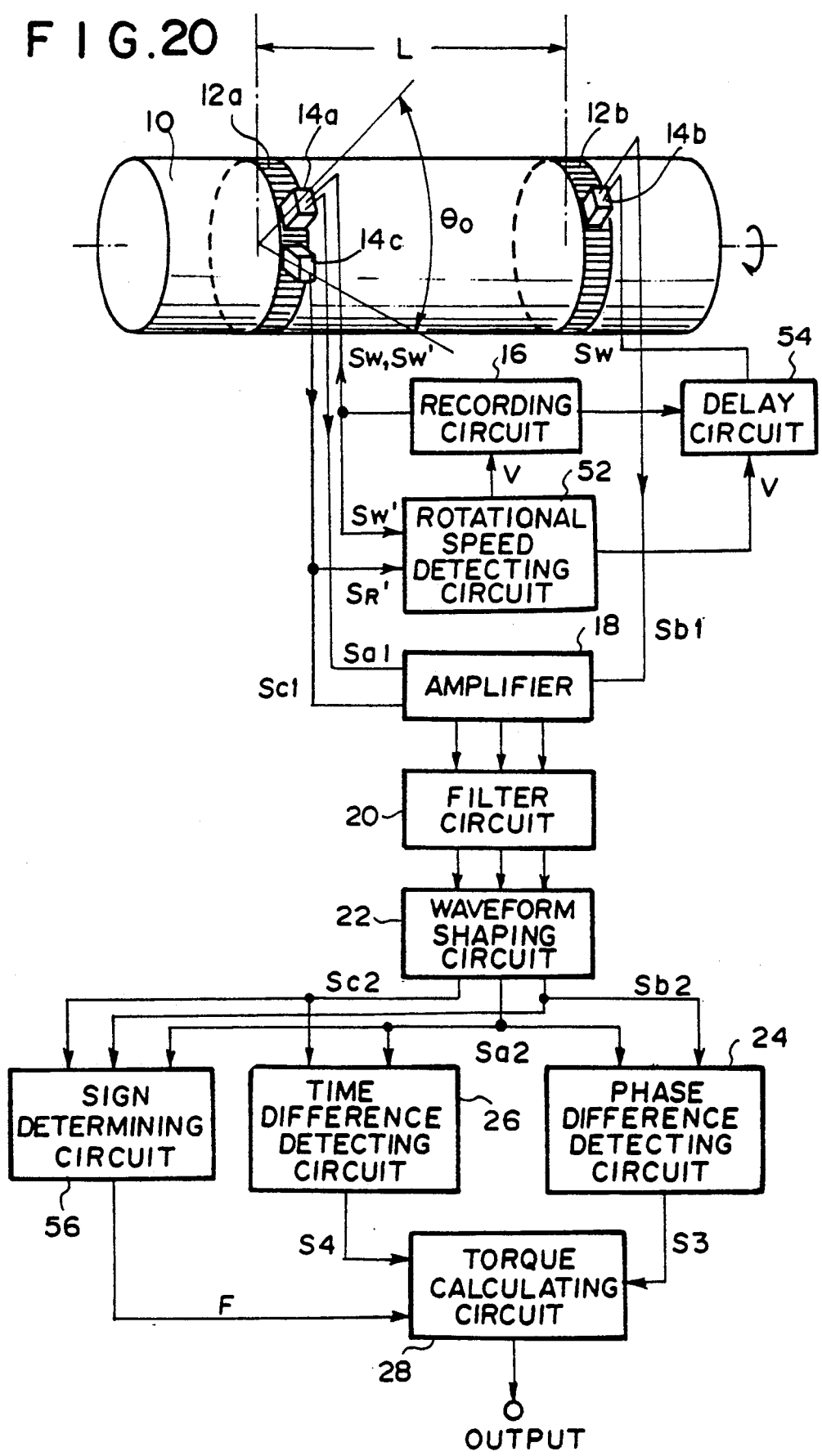
FIG. 20 is a schematic view showing a torque detecting system in accordance with a fourth embodiment of the present invention.

However if the time $\Delta t_o$ is a fixed value, the reproduced signal Sb1 corresponding to a given reproduced signal Sa1 can be detected after the reproduced signal Sa1 next to the given reproduced signal Sa1 as shown in FIG. 19 when the rotational speed V of the rotational member 10 increases and the output periods of the reproduced signals Sa1, Sb1 and Sc1 are shortened over a predetermined limit. This results in an incorrect combination of the reproduced signals.

Accordingly, in this embodiment, the time $\Delta t_o$ is changed according to the rotational speed V of the rotational member 10. The time $\Delta t_o$ has only to be shorter than the output period of the reproduced signals Sa1 but it is preferred that the time $\Delta t_o$ be set so that the reproduced signals Sb1 is always between the reproduced signals Sa1 and Sc1, that is, the time $\Delta t_o$ is smaller than time difference t and larger than 0. When the time $\Delta t_o$ is so set, it can be determined that the combination of the reproduced signals is correct only when a reproduced signal Sb1 is detected after a reproduced signal Sa1 is detected (or a reproduced signal Sc1 depending on the rotating direction of the rotational member 10).

In this embodiment, a rotational speed signal representing the rotational speed V as calculated according to the formula (4) is output from the rotational speed detecting circuit 52 to the delay circuit 54. The delay circuit 54 determines the time $\Delta t_o$ on the basis of rotational speed signal and the angle $\theta o$ and outputs the position signal Sw given from the recording circuit 16 to the second magnetic head 14b after a delay of time $\Delta t_o$.

When the time $\Delta t_o$ is set to be a half of the time difference t ($\Delta t_o = t/2$), the detecting range of the phase difference $\Delta t$ can be uniform irrespective of whether the torque acting on the rotational member 10 is positive or negative. However the time $\Delta t_o$ may be set depending on the properties of the rotational member 10. That is, in the case where the positive torque can be large but the negative torque cannot be large, the time $\Delta t_o$ may be set to be slightly shorter than a half of the time difference t.

Now a fourth embodiment of the present invention will be described wit reference to FIGS. 20 to 26, hereinbelow.

Figure 15:
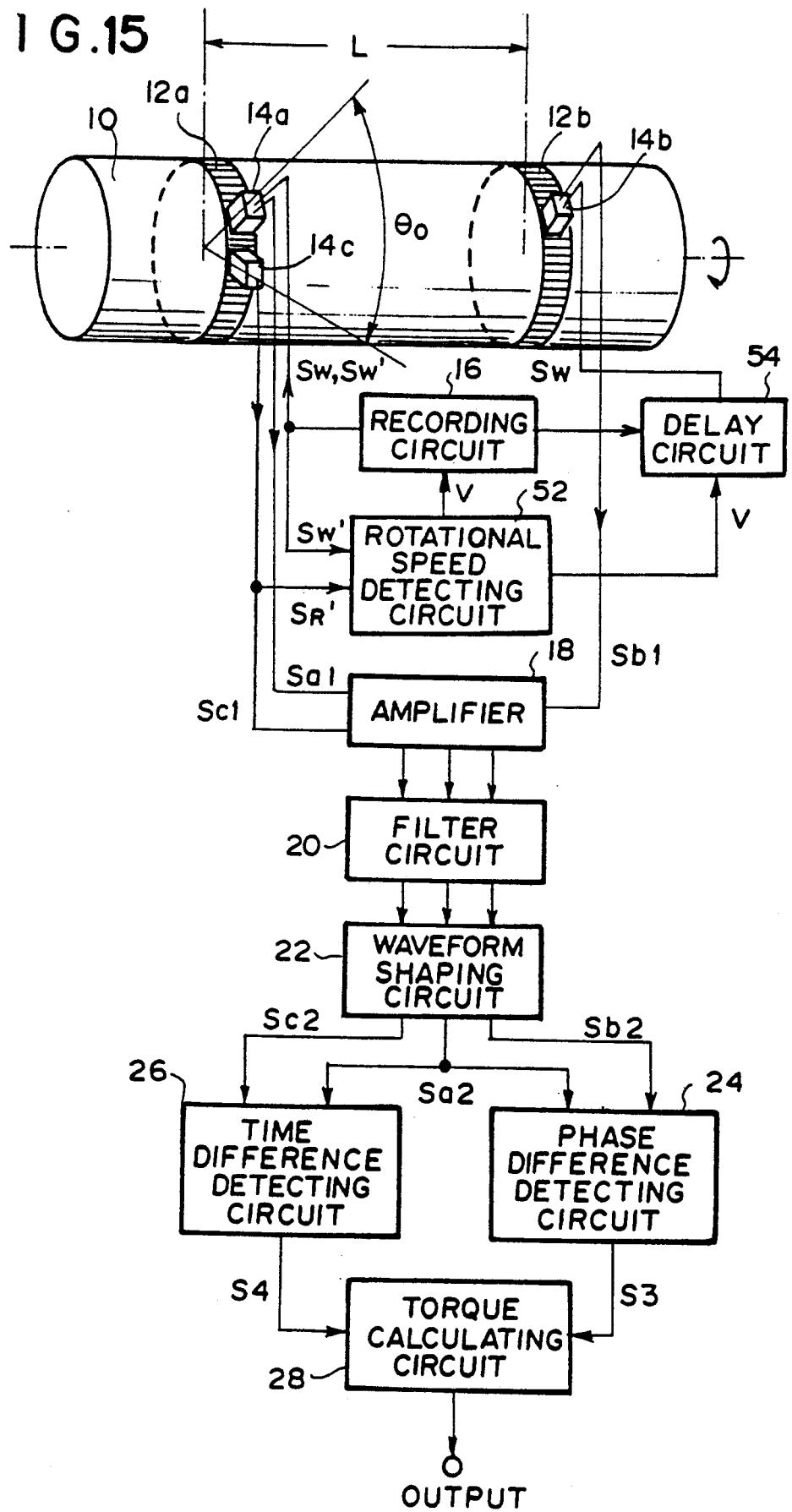
FIG. 15 is a schematic view showing a torque detecting system in accordance with a third embodiment of the present invention.

In this embodiment, a sign determining circuit 56 which determines the direction of the load (torque) acting on the rotational member 10 is provided in addition to the elements of the third embodiment shown in FIG. 15. The square wave signals Sa2 to Sc2 which are obtained by shaping the reproduced signals Sa1 to Sc1 reproduced through the first to third magnetic heads 14a to 14c are input into the sign determining circuit 56. The output of the sign determining circuit 56 is input into the torque calculating circuit 28 as a sign determination flag F.

Figure 21:
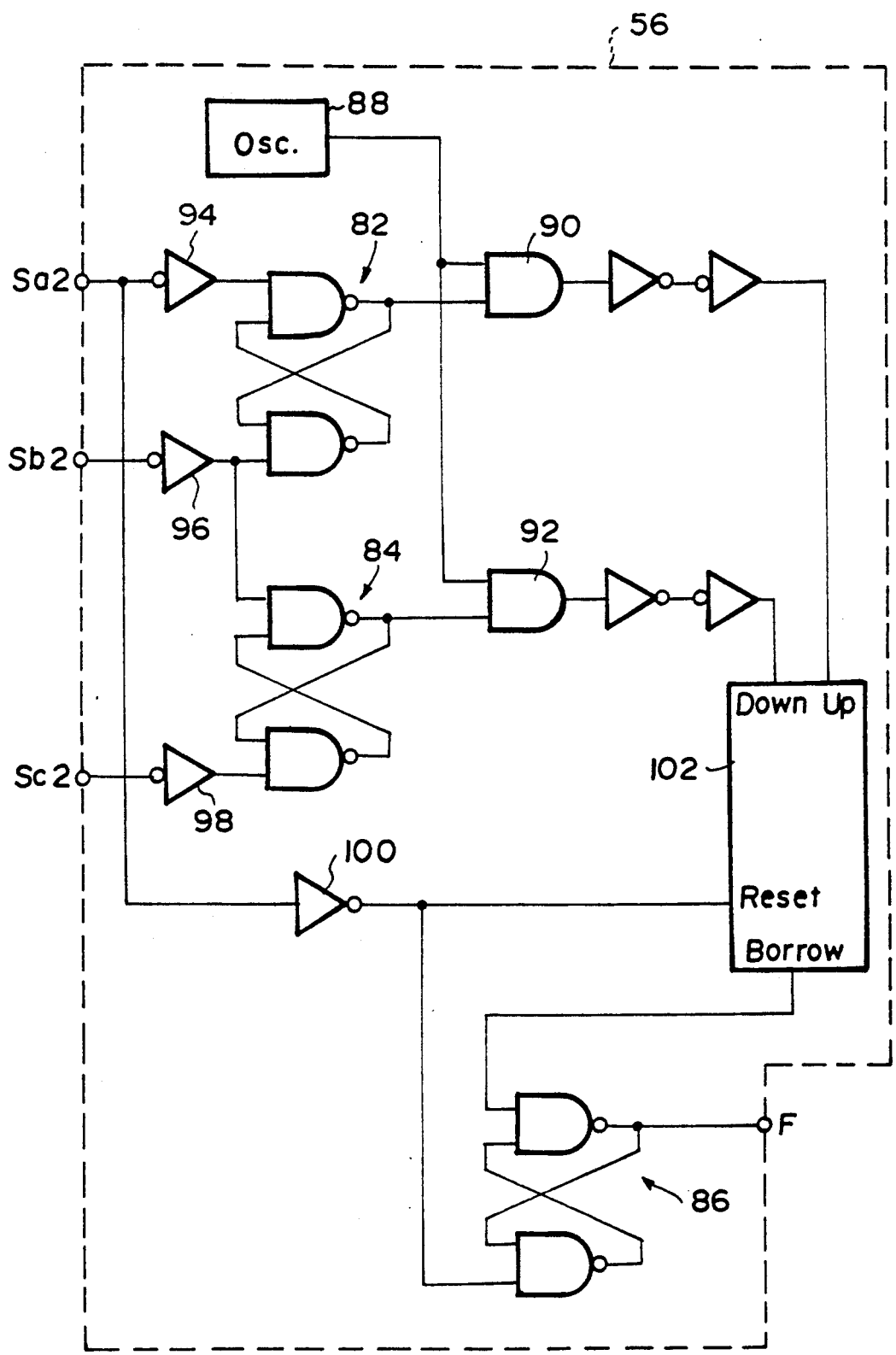
FIG. 21 is a circuit diagram of the sign determining circuit employed in the fourth embodiment.
Figure 22:
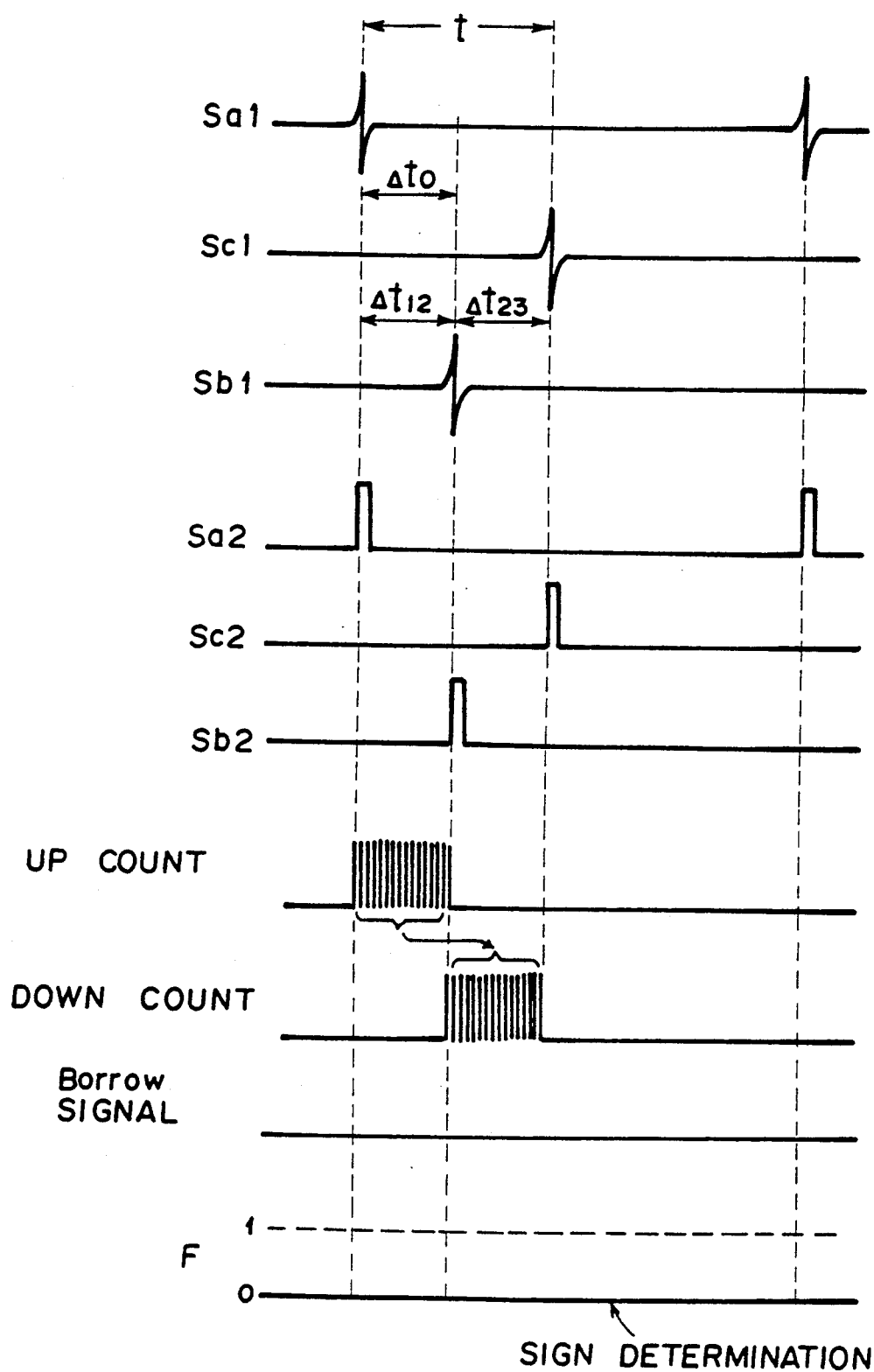
FIG. 22 is a timing chart for illustrating the operation of the sign determining circuit while the rotational member is rotating under no load.
Figure 23:
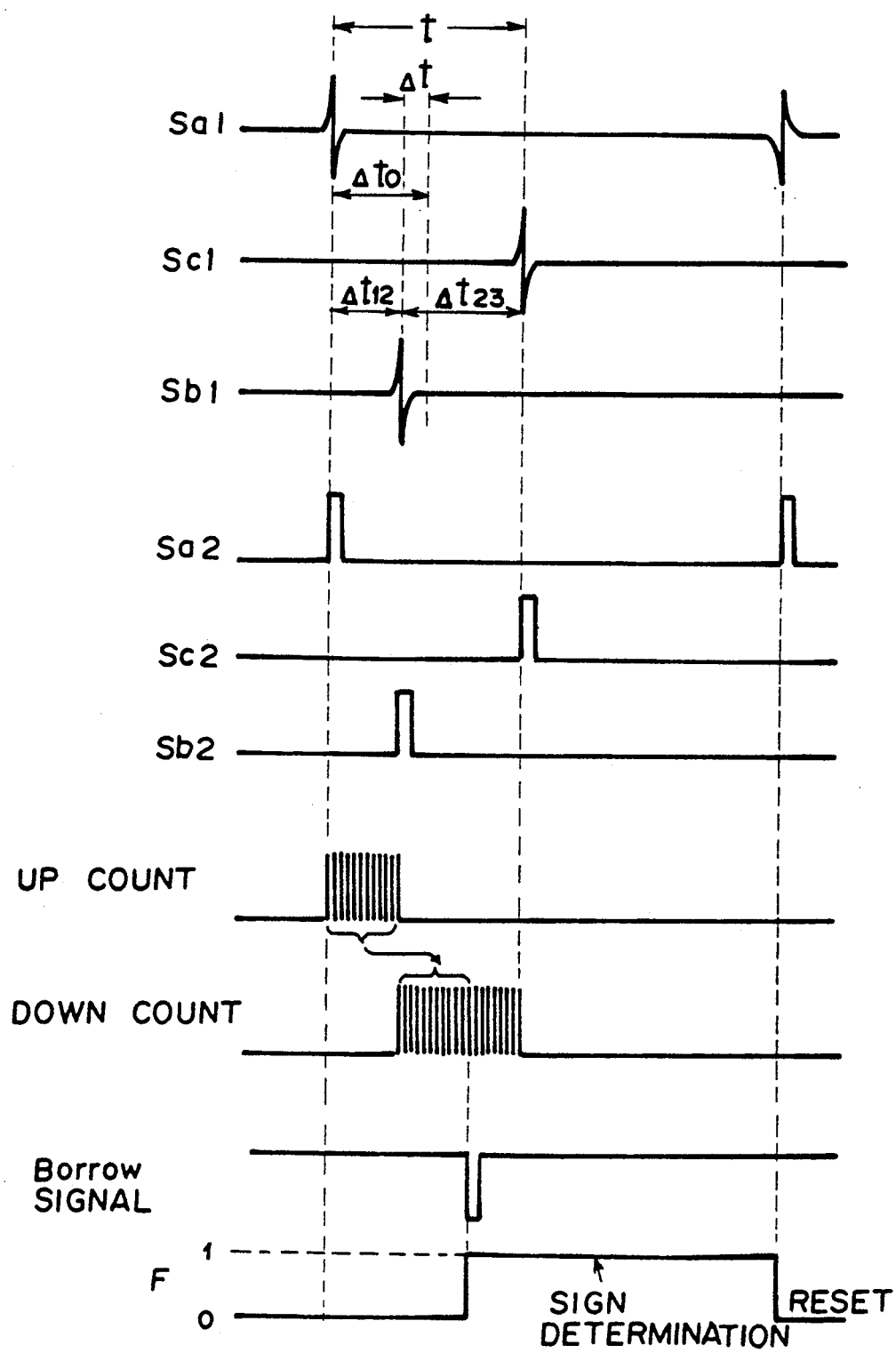
FIG. 23 is a timing chart for illustrating the operation of the sign determining circuit while the rotational member is rotating under negative torque.
Figure 24:
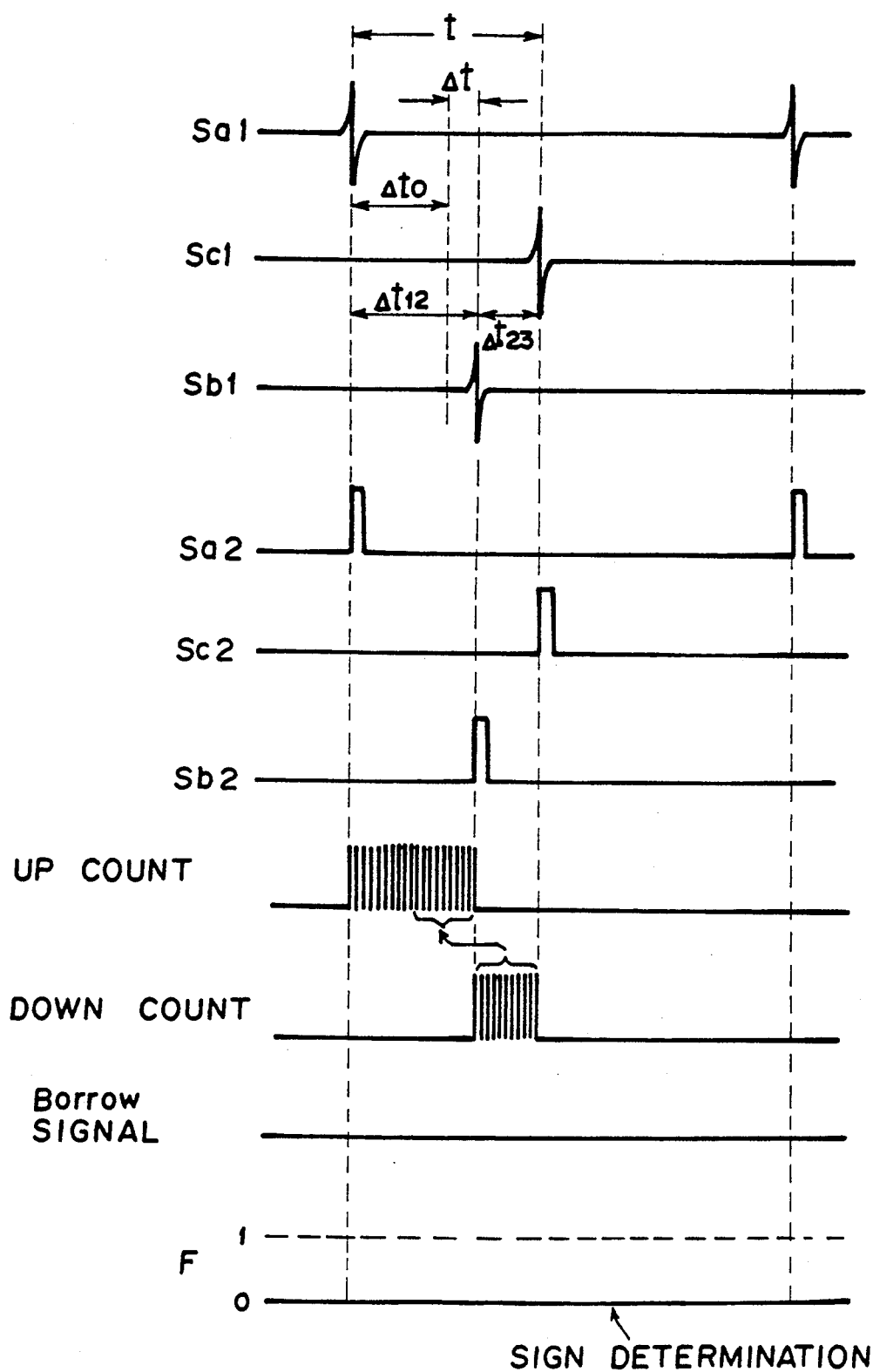
FIG. 24 is a timing chart for illustrating the operation of the sign determining circuit while the rotational member is rotating under positive torque.

FIG. 21 shows an example of the sign determining circuit 56, and FIGS. 22 to 24 are timing charts for illustrating the operation of the sign determining circuit 56. The sign determination circuit 56 comprises three flip flops 82, 84 and 86, a clock oscillator 88, a pair of AND circuits 90 and 92, four NOT circuits 94, 96, 98 and 100, and an up-and-down counter 102.

In this embodiment, the delay circuit 54 sets the delay time $\Delta t_o$ at a half of the time difference t between the reproduced signals Sa1 and Sc1 reproduced through the first and third magnetic heads 14a and 14c. Accordingly, while the rotational member 10 is rotating under no load, the relation of the reproduced signals Sa1 to Sc1 and the square wave signals Sa2 to Sc2 is as shown in FIG. 22, and the phase difference $\Delta t_{12}$ between the reproduced signals Sa1 and Sb1 and the phase difference $\Delta t_{23}$ between the reproduced signals Sb1 and Sc1 are equal to the delay time $\Delta t_o$ which is equal to a half of the time difference t.

The square wave signal Sa2 is applied to a set terminal of the flip flop 82 (FIG. 21) by way of the NOT circuit 94, and the square wave signal Sb2 is applied to a reset terminal of the flip flop 82 and a set terminal of the flip flop 84 by way of the NOT circuit 96. Further the square wave signal Sc2 is applied to a reset terminal of the flip flop 84 by way of the NOT circuit 98.

The output of the flip flop 82 is supplied to the AND circuit 90 together with the output of the clock oscillator 88, and the output of the AND circuit 90 is supplied to an up-count terminal of the counter 102. The output of the flip flop 84 is supplied to the AND circuit 92 together with the output of the clock oscillator 88, and the output of the AND circuit 92 is supplied to a down-count terminal of the counter 102.

Further the square wave signal Sa2 is applied to a reset terminal of the counter 102 and a reset terminal of the flip flop 86 by way of the NOT circuit 100, and a borrow signal output of the counter 102 is supplied to a set terminal of the flip flop 86.

When the square wave signal Sa2 is input into the sign determining circuit 56, the counter 102 and the flip flop 86 are reset and at the same time the counter 102 immediately begins to count up. When the square wave signal Sb2 is subsequently input, counting of the counter 102 is shifted to down counting and the down counting is stopped in response to subsequent input of the square wave signal Sc2.

Accordingly, under no load, $\Delta t_{12}$, $\Delta t_{23}$ and $\Delta t_o$ are equal to each other, and no borrow signal is output from the counter 102 as shown in FIG. 22, whereby the flip flop 86 is kept reset and the sign determination flag F is kept at 0.

When a negative torque is acting on the rotational member 10, $\Delta t_{12}$, $\Delta t_{23}$ and $\Delta t_o$ are small in this order ($\Delta t_{12} < \Delta t_{23} < \Delta t_o$) and the value of the counter 102 is negative, whereby the borrow signal is generated to set the flip flop 86 and to set the sign determination flag F to 1. That the sign determination flag F is 1 represents that the torque on the rotational member 10 is negative.

On the other hand, when a positive torque is acting on the rotational member 10, $\Delta t_{12}$, $\Delta t_{23}$ and $\Delta t_o$ are large in this order ($\Delta t_{12} > \Delta t_{23} > \Delta t_o$) and the value of the counter 102 is positive, whereby no borrow signal is generated. Accordingly the flip flop 86 is kept reset and the sign determination flag F is kept at 0. That the sign determination flag F is 0 represents that the torque on the rotational member 10 is positive.

The torque calculating circuit 28 calculates the angle of torsion $\theta$ on the basis of the phase difference $\Delta t$ (being equal to the absolute value of the difference between $\Delta t_{12}$ and $\Delta t_o$), the time difference t, the angle $\theta o$ and the sign determination flag F from the sign determining circuit 56 according to the following formula.

$$\theta = K.(\Delta t/t).\theta o \qquad (5)$$

wherein K is $-1$ when the sign determination flag F is 1 and $+1$ when the sign determination flag F is 0. Then the torque calculating circuit 28 calculates the torque T acting on the rotational member 10 on the basis of the angle of torsion $\theta$ according to the aforesaid formula (2).

As can be understood from the description above, in accordance with this embodiment, not only the magnitude of the torque on the rotational member 10 but also the direction thereof can be detected with a high accuracy.

Though, in this embodiment, the delay time $\Delta t_o$ is set to be equal to t/2, it need not be so, so long as the initial value of the counter 102 is set to conform to the delay time $\Delta t_o$ set. In this embodiment, the initial value of the counter 102 is set at 0.

Now a fifth embodiment of the present invention will be described with reference to FIGS. 25 to 27, hereinbelow.

In order to prevent an error in calculation of the torque by the torque calculating circuit 28 in the first embodiment, the phase difference $\Delta t$ detected by the phase difference detecting circuit 24 and the time difference t detected by the time difference detecting circuit 26 must be correctly combined one-to-one. As a result, in accordance with the first embodiment, the torque acting on the rotational member 10 can be detected only when load acts in a particular direction determined by the relative position between the first and third magnetic heads 14a and 14c.

In this embodiment, a counter control circuit 30 is provided in addition to the elements of the first embodiment. The reproduced signals Sa1 to Sc1 and the square wave signals Sa2 to Sc2 are input into the counter control circuit 30. The counter control circuit 30 controls the counters of the phase difference detecting circuit 24 and the time difference detecting circuit 26 in synchronization with one of the reproduced signals Sa1 to Sc1 that is detected first and one of the same that is detected last.

The operation of the torque detecting system of this embodiment is as follows.

It is first assumed that the rotational member 10 is rotating in the direction the arrow in FIG. 4, that is, from the first magnetic head 14a toward the third magnetic head 14c.

Figure 26:
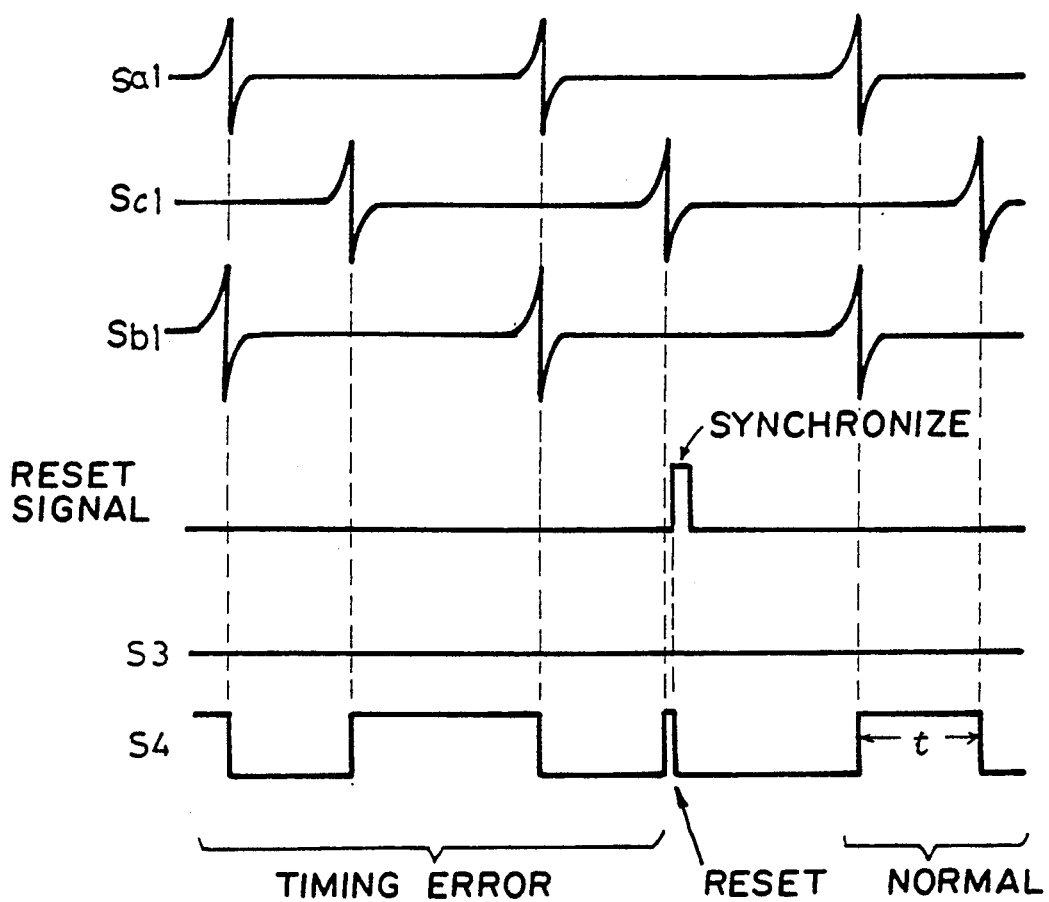
FIGS. 26 and 27 are timing charts for illustrating the operation of the fifth embodiment.

In this case, the counter control circuit 30 outputs a reset signal to the phase difference detecting circuit 24 and the time difference detecting circuit 26 in synchronization with detection of a reproduced signal Sc1 as shown in FIG. 26 while the rotational member 10 is rotating under no load. With this processing, a timing error, if any, can be canceled by the reset signal.

Figure 25:
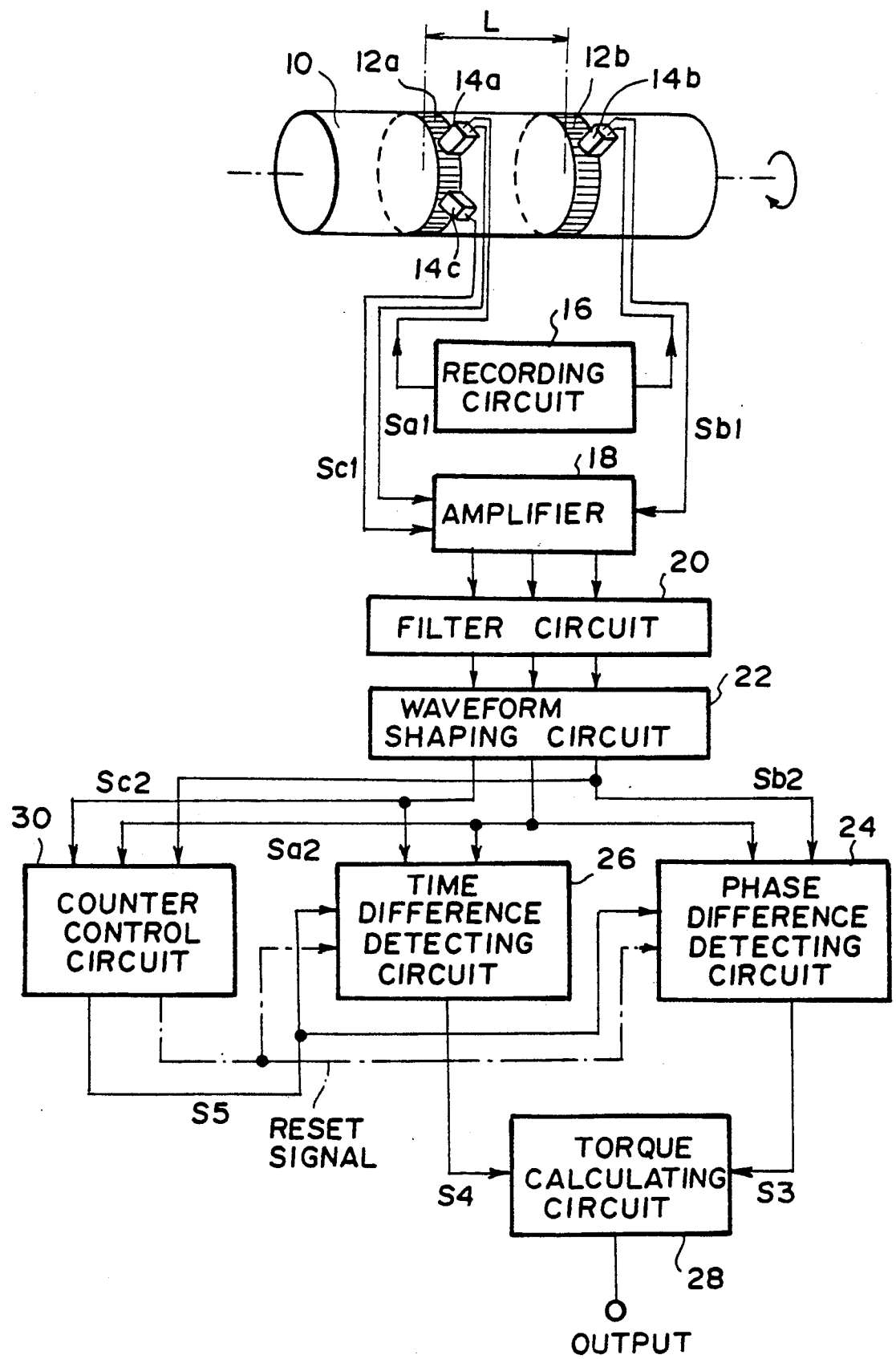
FIG. 25 is a schematic view showing a torque detecting system in accordance with a fifth embodiment of the present invention.
Figure 27:
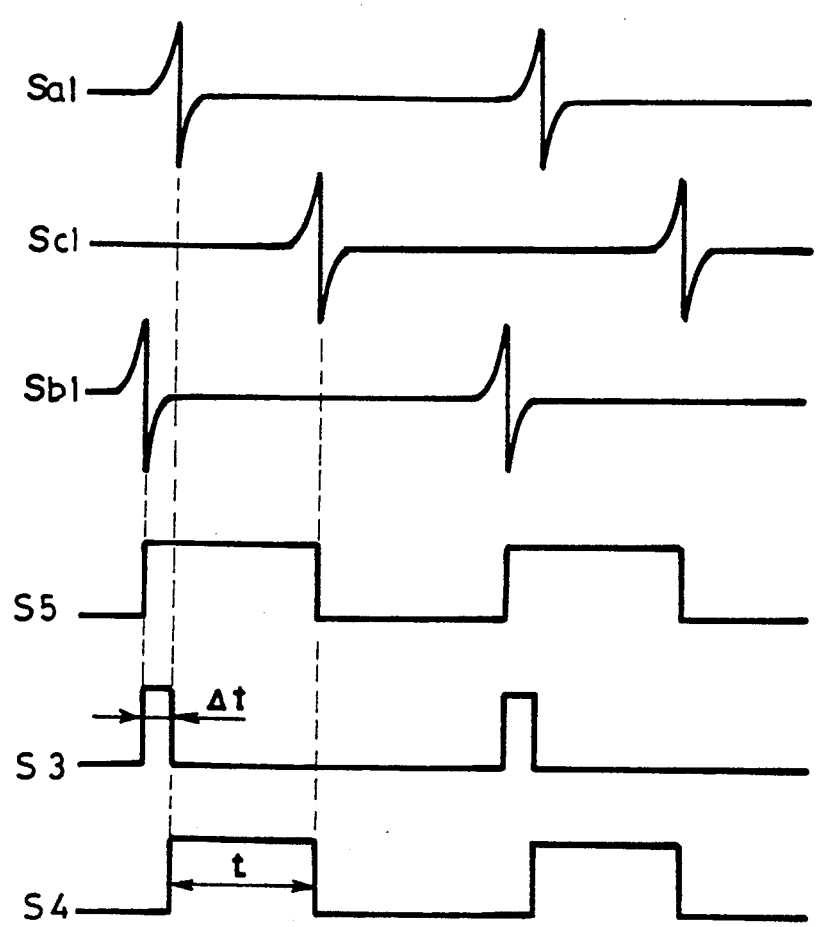
Figure 28:
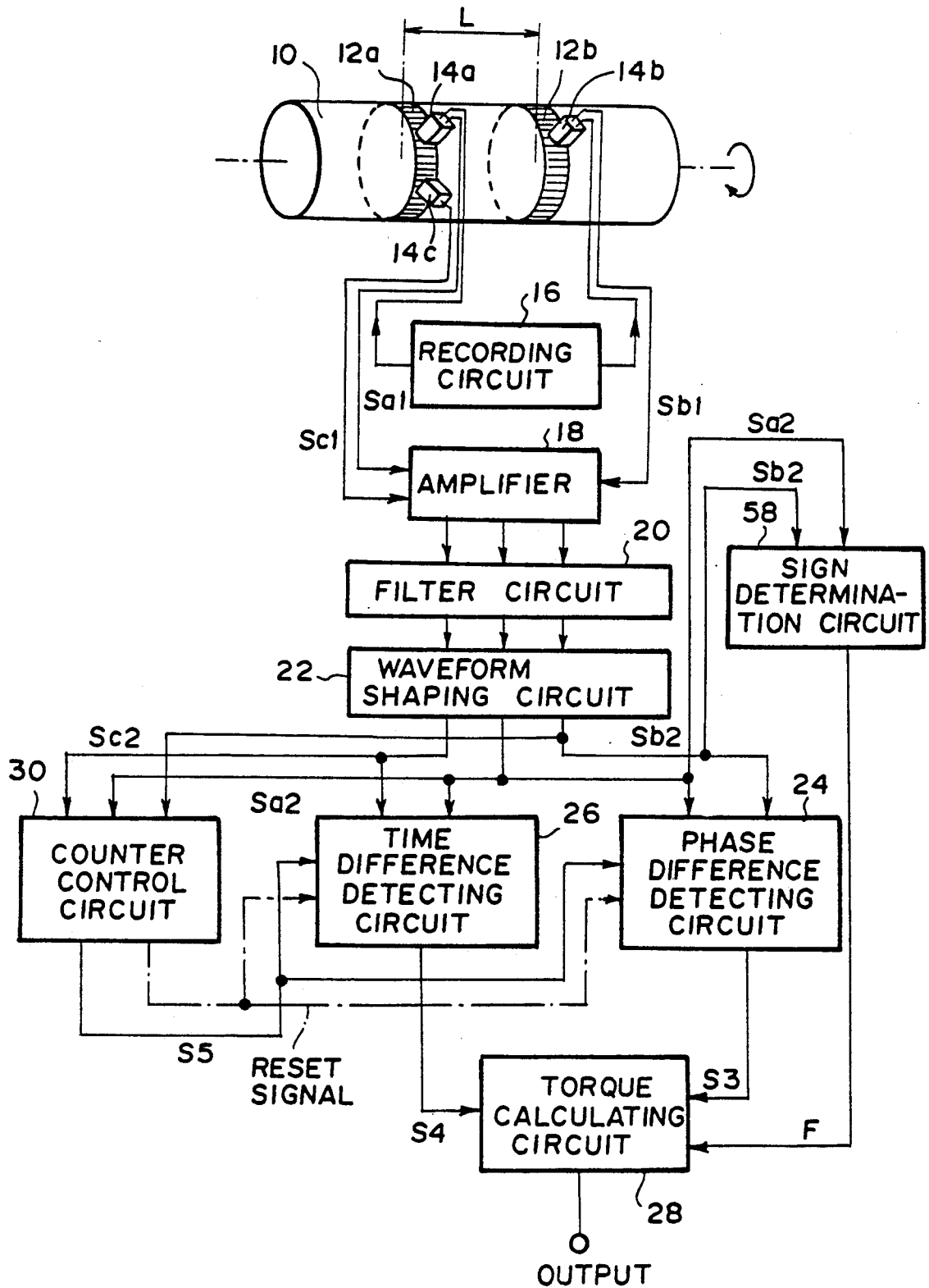
FIG. 28 is a schematic view showing a torque detecting system in accordance with a sixth embodiment of the present invention.

When load acts on the rotational member 10 so that torsion is produced in the rotational member 10 in the direction of the arrow in FIG. 25 (a negative torque), there is produced a phase difference $\Delta t$ between the reproduced signals Sa1 and Sb1 as shown as detecting signals S3 in FIG. 27. Further there is produced a time difference t between the reproduced signals Sa1 and Sc1 as shown as detecting signals S4 in FIG. 27.

The reproduced signals Sa1, Sb1 and Sc1 which are reproduced respectively through the first to third magnetic heads 14a 14b and 14c are amplified by the amplifier 18, and input into the waveform shaping circuit 22 through the filter circuit 20. The waveform shaping circuit 22 shapes them into the square wave signals Sa2, Sb2 and Sc2.

The square wave signals Sa2 and Sb2 are input into the phase difference detecting circuit 24 and the square wave signals Sa2 and Sc2 are input into the time difference detecting circuit 26. Further all the square wave signals Sa2 to Sc2 are input into the counter control circuit 30. The counter control circuit 30 produces a counter control signal S5 (FIG. 27) on the basis of one of the reproduced signals Sa1 to Sc1 that is detected first and one of the same that is detected last and outputs it to the phase difference detecting circuit 24 and the time difference detecting circuit 26.

The counter of the phase difference detecting circuit 24 operates in synchronization with the counter control signal S5 and detects the phase difference Δt between the reproduced signals Sa1 and Sb1 (detecting signal S3 in FIG. 27). The counter of the time difference detecting circuit 26 operates in synchronization with the counter control signal S5 and detects the time difference t between the reproduced signals Sa1 and Sc1 (detecting signal S4 in FIG. 27). The detecting signals S3 and S4 are input into the torque calculating circuit 28.

In the first embodiment, the phase difference detecting circuit 24 operates in synchronization with the time difference t between the reproduced signals Sa1 and Sc1 as can be understood from FIG. 3, and accordingly, when the reproduced signal Sb1 is detected before the reproduced signal Sa1, the phase difference Δt between the reproduced signals Sa1 and Sb1 cannot be detected. On the other hand, in this embodiment, since the phase difference signal S3 is in synchronization with the counter control signal S5, the phase difference Δt and the time difference t can be surely correctly combined one-to-one.

Also in this embodiment, the torque T is calculated according to the formula (3).

Though, in the above description, the rotational member 10 is rotating in the direction of the arrow in FIG. 25, when the rotational member 10 is rotating in the reverse direction, a detecting error due to a timing error can be avoided by outputting the reset signal of the counter control circuit 30 under no load in synchronization with the reproduced signals Sa1. Further, though, in the above description, the operation of the torque detecting system of the fifth embodiment is described in conjunction with load in one direction, the torque can be detected with a high accuracy irrespective of the direction of the load acting on the rotational member 10 in accordance with the fifth embodiment.

Now a sixth embodiment of the present invention will described with reference to FIGS. 28 to 31, hereinbelow.

In this embodiment, a sign determining circuit 58 which determines the direction of the load on the rotational member 10 on the basis of the detecting timing of the reproduced signals Sa1 and Sb1 is provided in addition to the elements of the fifth embodiment shown in FIG. 25.

The square wave signals Sa2 and Sb2 are input into the sign determining circuit 58 and the sign determination flag F output from the sign determining circuit 58 is input into the torque calculating circuit 28.

Figure 29:
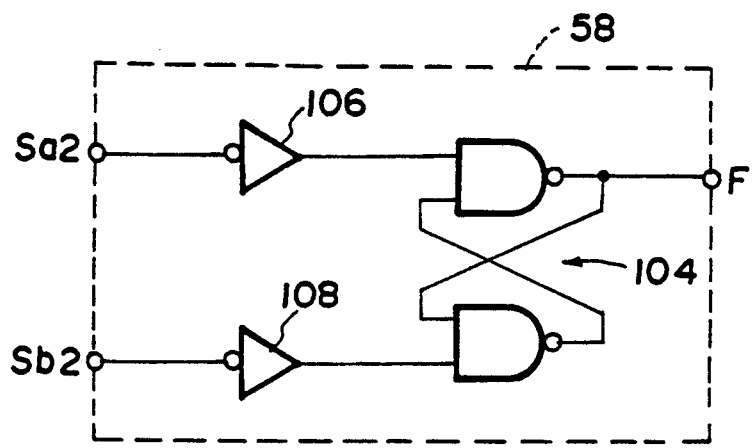
FIG. 29 is a circuit diagram of the sign determining circuit employed in the sixth embodiment.

As shown in FIG. 29, the sign determining circuit 58 comprises a flip flop 104 for outputting the sign determination flag F and a pair of NOT circuit 106 and 108 which are respectively connected to a pair of input terminals of the flip flop 104. The square wave signal Sa2 is input into a set terminal of the flip flop 104 through the NOT circuit 106 and the square wave signal Sb2 is input into a reset terminal of the flip flop 104 through the NOT circuit 108.

Figure 30:
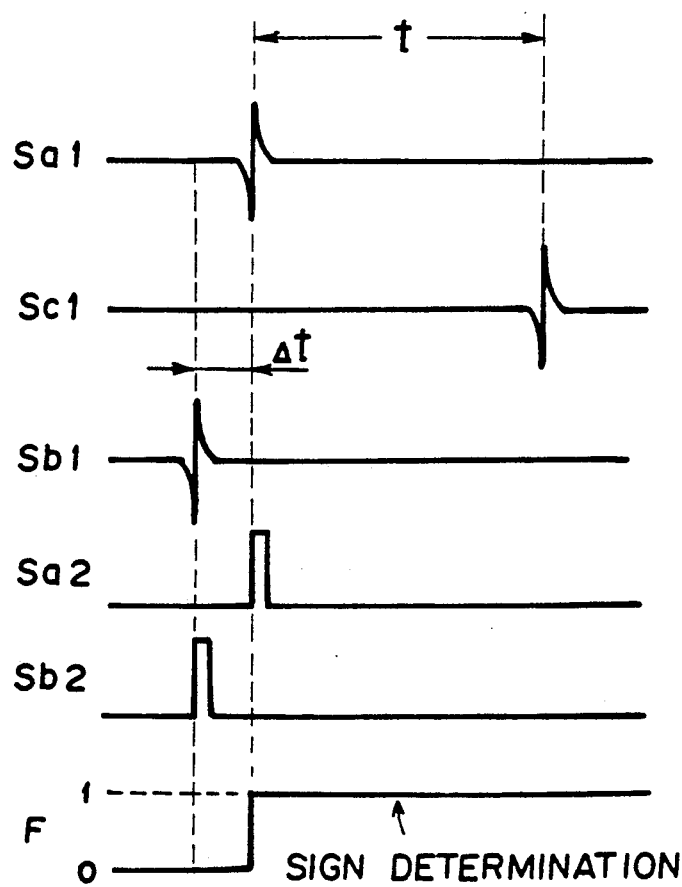

Now the operation of the sign determining circuit 58 will be described with reference to the timing charts shown FIGS. 30 and 31, hereinbelow.

When a negative torque is acting on the rotational member 10, the reproduced signal Sb1 is detected before the reproduced signal Sa1 and accordingly the square wave signal Sb2 is input into the sign determining circuit 58 before the square wave signal Sa2. Accordingly, the flip flop 104 is first reset by the square wave signal Sb2 and then set by the square wave signal Sa2, whereby the sing determination flag F at 1 is output to the torque calculating circuit 28.

On the other hand, when a positive torque is acting on the rotational member 10, the reproduced signal Sa1 is detected before the reproduced signal Sb1 and accordingly the square wave signal Sa2 is input into the sign determining circuit 58 before the square wave signal Sb2. Accordingly, the flip flop 104 is first set by the square wave signal Sa2 and then reset by the square wave signal Sb2, whereby the sing determination flag F at 0 is output to the torque calculating circuit 28.

The torque calculating circuit 28 calculates the angle of torsion $\theta$ according to the formula (5) and calculates the torque T on the rotational member 10 according to the formula (3).

What is claimed is;

1. A torque detecting system for detecting torque acting on a rotational member comprising
   a first magnetic head which is positioned close to the peripheral surface of the rotational member and is opposed to a first magnetic recording portion provided on the peripheral surface of the rotational member,
   a second magnetic head which is positioned close to the peripheral surface of the rotational member and is opposed to a second magnetic recording portion provided on the peripheral surface of the rotational member, the second magnetic head being spaced from the first magnetic head by a predetermined distance in the longitudinal direction of the rotational member,
   a third magnetic head which is positioned close to the peripheral surface of the rotational member and is opposed to the first magnetic recording portion, the third magnetic head being angularly spaced from the first magnetic head by a predetermined angle $\theta_o$ in the circumferential direction of the rotational member,
   a recording means which records first and second position signals respectively on the first and second magnetic recording portions through the first and second magnetic heads while the rotational member is rotating under no load,
   a reproducing means which reproduces the first position signal through the first and third magnetic heads and the second position signal through the second magnetic head while the rotational member is rotating under load,
   a phase difference detecting means which detects the phase difference Δt between the position signals reproduced through the first and second magnetic heads, a time difference detecting means which detects the time difference t between the position signals reproduced through the first and third magnetic heads, a torsional angle calculating means which calculates the angle of torsion $\theta$ of the rotational member when it is rotating under load on the basis of the predetermined angle, the phase difference and the time difference, and a torque calculating means which calculates the torque T acting on the rotational member on the basis of the angle of torsion.

2. A torque detecting system as defined in claim 1 in which the angle of torsion $\theta$ of the rotational member is calculated on the basis of the angle $\theta_o$ between the first and third magnetic heads, the phase difference $\Delta t$ and the time difference t according to the formula $\theta = (\Delta t/t) \cdot \theta_o$.

3. A torque detecting system as defined in claim 2 in which the torque T acting on the rotational member is calculated on the basis of the angle of torsion $\theta$ according to the formula $T = \pi G d^4 \theta / 64 L$ wherein G represents the transverse modulus of the rotational member, d represents the diameter of the rotational member and L represents the distance between the first and second magnetic heads.

4. A torque detecting system as defined in claim 1 in which said magnetic recording portions are formed by forming layers of magnetic material on the peripheral surface of the rotational member.

5. A torque detecting system as defined in claim 1 in which said rotational member is made of magnetic material and said magnetic recording portions are parts of the peripheral surface of the rotational member.

6. A torque detecting system as defined in claim 1 in which said first and third magnetic heads are in the form of a single multi-gap magnetic head having a pair of gaps.

7. A torque detecting system as defined in claim 1 further comprising a rotational speed detecting means which detects the rotational speed of the rotational member, and a signal property changing means which changes the properties of the position signals recorded on the first and second magnetic recording portions according to the rotational speed of the rotational member.

8. A torque detecting system as defined in claim 7 in which said signal property changing means changes the output intervals of the position signals.

9. A torque detecting system as defined in claim 7 in which said signal property changing means changes the pulse widths of the position signals.

10. A torque detecting system as defined in claim 7 in which said signal property changing means changes the intensities of the position signals.

11. A torque detecting system as defined in claim 7 in which said rotational speed detecting means comprises a signal recording and reproducing means which records a position signal on a magnetic recording portion provided on the rotational member through a magnetic head and reproduces the position signal through a magnetic head, and a rotational speed calculating means which calculates the rotational speed on the basis of the reproduced position signal.

12. A torque detecting system as defined in claim 11 in which said signal recording and reproducing means comprises a pair of magnetic heads which are angularly spaced from each other by a predetermined angle in a circumferential direction of the rotational member, and said rotational speed calculating means calculates the rotational speed on the basis of the predetermined angle and the time difference between reproduced position signals which are obtained by reproducing the position signal, which has been recorded through one of the magnetic heads, through both the magnetic heads.

13. A torque detecting system as defined in claim 12 in which said first magnetic head doubles said one of the magnetic heads and said third magnetic head doubles the other of the magnetic heads.

14. A torque detecting system as defined in claim 12 in which said magnetic recording portion on which said signal recording and reproducing means records the position signal is formed on the peripheral surface of the rotational member in addition to the first and second magnetic recording portions and said pair of magnetic heads of the rotational speed detecting means are provided in addition to said first to third magnetic heads.

15. A torque detecting system as defined in claim 7 further comprising a delay means which delays the position signal recorded through the second magnetic head in phase by a predetermined time relative to the position signal recorded through the first magnetic head so that the reproduced signals reproduced through the second magnetic head has a predetermined initial phase difference relative to the reproduced signals reproduced through the first magnetic head.

16. A torque detecting system as defined in claim 15 further comprising a load direction determining means which determines the direction of load acting on the rotational member.

17. A torque detecting system as defined in claim 16 in which said load direction determining means determines the direction of load acting on the rotational member based on comparison of the initial phase difference and the phase difference between the reproduced position signals which are respectively reproduced through the first and second magnetic heads.

18. A torque detecting system as defined in claim 16 in which said load direction determining means determines the direction of load acting on the rotational member based on comparison of the difference between the times at which the reproduced position signals respectively reproduced through the first and second magnetic heads are detected and the difference between the times at which the reproduced position signals respectively reproduced through the second and third magnetic heads are detected.

19. A torque detecting system as defined in claim 1 further comprising a detecting timing control means which controls the detecting timings of the phase difference detecting means and the time difference detecting means in synchronization with one of the reproduced signals reproduced through the first to third magnetic heads that is detected first and one of the reproduced signals reproduced through the first to third magnetic heads that is detected last.

20. A torque detecting system as defined in claim 19 in which said detecting timing control means controls counters in the phase difference detecting means and the time difference detecting means.

21. A torque detecting system as defined in claim 19 further comprising a load direction determining means which determines the direction of load acting on the rotational member.

22. A torque detecting system as defined in claim 20 in which said load direction determining means determines the direction of load acting on the rotational member according to the detecting timing of the reproduced position signals respectively reproduced through the first and second magnetic heads.

* * * * *

UNITED STATES PATENT AND TRADEMARK OFFICE
CERTIFICATE OF CORRECTION

PATENT NO. : 5,301,559
DATED : April 12, 1994
INVENTOR(S) : Tsuji, et al.

It is certified that error appears in the above-identified patent and that said Letters Patent is hereby corrected as shown below:

Column 3, Equation (3), line 53, change

"$T = \pi^2 Gd^4 .\theta/64L$" to -- $T = 2\pi Gd^4 .\theta/64L$ --

Column 7, Equation (3), line 28, change

"$T = \pi^2 Gd^4 .\theta/64L$" to -- $T = 2\pi Gd^4 .\theta/64L$ --

Column 17, line 24, change

"$T = \pi^2 Gd^4 .\theta/64L$" to -- $T = 2\pi Gd^4 .\theta/64L$ --

Signed and Sealed this

First Day of November, 1994

Attest:

BRUCE LEHMAN

Attesting Officer     Commissioner of Patents and Trademarks